United States Patent [19]

Suzuki et al.

[11] Patent Number: 5,768,403

[45] Date of Patent: Jun. 16, 1998

[54] IMAGE-AREA IDENTIFYING SYSTEM FOR A COLOR IMAGE PROCESSING APPARATUS

[75] Inventors: Yuzuru Suzuki; Yoshiharu Hibi, both of Kanagawa, Japan

[73] Assignee: Fuji Xerox Co., Ltd., Tokyo, Japan

[21] Appl. No.: 361,171

[22] Filed: Dec. 21, 1994

Related U.S. Application Data

[63] Continuation of Ser. No. 882,132, May 13, 1992, abandoned.

[30] Foreign Application Priority Data

May 14, 1991 [JP] Japan .................................. 3-107967

[51] Int. Cl.$^6$ .................................................. G06K 9/00
[52] U.S. Cl. ........................ 382/165; 382/162; 382/164; 358/467; 358/520; 348/396
[58] Field of Search .................... 382/17, 164, 266, 382/165, 162; 358/462, 467, 520, 453, 451; 348/396, 421; 355/327

[56] References Cited

U.S. PATENT DOCUMENTS

| | | | |
|---|---|---|---|
| 4,577,235 | 3/1986 | Kannapell | 358/280 |
| 4,700,399 | 10/1987 | Yoshida | 382/17 |
| 4,743,959 | 5/1988 | Frederiksen | 348/421 |
| 4,930,007 | 5/1990 | Sugiura | 358/467 |
| 4,982,342 | 1/1991 | Moribe | 382/21 |
| 5,014,124 | 5/1991 | Fujisawa | 358/462 |
| 5,113,252 | 5/1992 | Horie et al. | 358/451 |
| 5,162,860 | 11/1992 | Nami et al. | 355/327 |

FOREIGN PATENT DOCUMENTS

| | | | |
|---|---|---|---|
| 63-193770 | 8/1988 | Japan | G06F 15/68 |
| 63-205783 | 8/1988 | Japan | G06F 15/70 |
| 63-51631 | 10/1988 | Japan | H04N 1/46 |
| 2-244876 | 9/1990 | Japan | G08F 15/88 |
| 2-294884 | 12/1990 | Japan | G06F 15/70 |
| 2-295355 | 12/1990 | Japan | G06F 15/70 |
| 2-295358 | 12/1990 | Japan | G06F 15/70 |

*Primary Examiner*—Jose L. Couso
*Assistant Examiner*—Anh Hong Do
*Attorney, Agent, or Firm*—Finnegan, Henderson, Farabow, Garrett & Dunner, L.L.P.

[57] ABSTRACT

An image-area identifying system for a color image processing apparatus comprises: image area identifying means for identifying a character area or a half-tone image area by using characteristic values of pixels in each pixel block of an image area; hue determining means for determining, every pixel, hue of received color image data to produce a necessary color switch signal or an unnecessary color switch signal; and data reset means for resetting unnecessary image data on the basis of the results of the block-basis area identifying determination by the image area identifying means and the pixel-basis hue determination by the hue determining means. The image area identifying means may be nonlinear quantitizers for quantitizing three characteristic values, "in-block average value", "number of in-block high-level pixels" (Ph), and "number of in-block medium-level pixels" (Pm) for reducing the quantities of data representing the three characteristic values, and a three-dimensional look-up table accessed by the output data of the nonlinear quantitizers, to produce a character area data signal or a half-tone image data signal.

23 Claims, 12 Drawing Sheets

| HUE \ FLAG | r | m | c' | m' | y' |
|---|---|---|---|---|---|
| W ← | 0 | 0 | 0 | 0 | 0 |
| Y ← | * | 0 | 0 | 0 | 1 |
| M ← | * | 0 | 0 | 1 | 0 |
| C ← | * | 0 | 1 | 0 | 0 |
| B ← | * | 0 | 1 | 1 | 0 |
| G ← | * | 0 | 1 | 0 | 1 |
| R ← | * | 0 | 0 | 1 | 1 |
| K ← | 0 | 1 | * | * | * |

IMAGE-AREA IDENTIFYING SYSTEM FOR A COLOR IMAGE PROCESSING APPARATUS

This application is a continuation of application Ser. No. 07/882,132 filed May 13, 1992, now abandoned.

BACKGROUND OF THE INVENTION

1. Field of the Invention

The present invention relates to an image-area identifying system for use with a color image processing apparatus for processing color image data containing characters and half-tone images.

2. Discussion of the Prior Art

A color copying machine is a type of color image processing apparatus. The color copying machine uses tone developing units for four colors, Y (yellow), M (magenta), C (cyan), and K (black). Four images of these colors are superposed by the developing units to compose a full color image. A color image on an original document is repeatedly scanned four times in connection with the four developing processes. Color image data thus read are processed for full color image reproduction.

A conventional color image processing apparatus will be briefly described with reference to FIG. 1.

In the color image processing apparatus, a color image on an original document is optically read by means of a line sensor. The color image data thus read is separated into data signals of three primary colors, B (blue), G (green), and R (red). The thus obtained separated color signals B, G, and R are applied to an END (equivalent neutral density) converter 31 where they are subjected to gray balance adjustment. The separated color signals B, G, and R thus gray balanced are input to a color masking (color correction) unit 32 where the color signals B, G, and R are converted into process color signals Y, M and C. In a UCR (under color removal) 33, a black K is generated and the under colors are removed. In a hue separation nonlinear filter, moire and mesh-dots are removed, and edges emphasis is performed. The multi-tone data signals X of process colors thus obtained are passed through a TRC (tone reduction control) 40, and converted into binary-coded data an SG (screen generator) 41. A charged photoreceptor is exposed to a laser beam which is controlled with the binary-coded data thus obtained.

The hue separation nonlinear filter receives the image data signals of Y, M, C, and K from the UCR 33 for black generation and under-color removal, and selects the image data X of the current developing process color from the received image data signals Y, M, C, and K. The selected image data signal x goes through two routes; one route consisting of a smoothing filter 34, and the other consisting of a γ converting circuit 36, an edge detect filter 37, and an edge emphasis LUT 38. The first route removes moire and mesh-dots from a half-tone image, thereby to smooth the image. The second route emphasizes edges of a character image. An adder 39 composes the output data signals of the first and second routes. The composite signal from the adder is output as a nonlinearfiltered signal. In the edge emphasis processing by the edge emphasis LUT 36, a hue detector 35 detects a hue of the input image and determines whether the current developing process color is necessary or not. If the input image is a black area, the chromatic signals of Y, M and C are not emphasized, while only the signal of K is emphasized according to quantities of edges.

With use of the nonlinear filter, binary images, such as characters and line images are edge-emphasized to provide a sharp image, and half-tone images, such as photograph or mesh-dot printing, are smoothed to provide smoothed images with improved granularity.

In binary images such as characters and line images, and half-tone images such as photograph and mesh-dot printing, if documents and image areas may be readily specified, the parameters can be optimumly selected for the respective image areas by specifying the type of image for each document or each image area. This leads to improvement of image reproduction quality. In an image containing characters and half-tone images (referred to as a character/half-tone image), one cannot help selecting the parameters able to reproduce both the binary image and the half-tone image at such a reproduction quality that is satisfactory, but not perfect.

Such a selection of the parameters results in weak edge-emphasis and unclear image for the binary images, and impure darkness at edges and small characters in black characters. In the half-tone image, the frequencies near the edge detect frequency are emphasized, losing a smoothness of the half-tone image. The reproduced half-tone image contains strange moire and is an edge-emphasized, hard image. To cope with this, it is required to identify three types of image areas, black characters, color characters and half-tone images, and to switch the parameters of the filter on the basis of the area identification. Image area identifying systems to realize the requirements have been proposed.

A proposal shown in FIG. 2A, disclosed in U.S. patent application Ser. No. 07/637,026, now U.S. Pat. No. 5,296,939 employs run-length encoding for area identification. In the proposal, a hue detector 41 detects any of eight different hues Y, M, C, K, W, B, G, and R, for each pixel. A comparator 42 compares the largest color signal of those Y, M and C with a threshold value $th_{max}$. The hue detector 41 also detects noise of low densities. When it detects the noise, the run-length to be given later becomes short, so that the image area will be mistakenly recognized and identified as a character area. To avoid this, the comparator 42 compares the largest dne with the threshold value $th_{max}$ to select the pixels of densities higher than a predetermined density and to provide candidates for character pixels. In other words, the comparator 42 functions to remove the noise.

A block generating portion 43 groups a plurality of pixels into blocks each consisting of 4×4 to 8×8 pixels. A block color determining portion 44 checks seven colors of pixels Y, M, C, K, B, G, and R, except W, to find the color which most frequently appears within a block, and concludes that it is a block color. In an example where one block consists of 4×4 pixels, and the results of counting the frequencies of the seven colors are: K =6, M =2, R =1, C =1, and W =6, the block color determining portion 44 determines that the block color is color K, of which the frequency is the highest of the color/black pixel colors except color W.

A fast-scan-direction color counter 46 receives one bit representing W(0) or other colors/black (1) from the block color determining portion 44, and counts the run-length of the colors/black blocks arrayed in the fast scan direction. A comparator 47 compares the count (run-length) of each block with a threshold value $th_{run}$. If the former is smaller than the latter, the block is a candidate for character.

When the run-length is used for expressing the image area every pixel, the mesh-dot area, like the character area, is expressed with short run-length. It is difficult to discriminate the mesh-dot area from the character area. When the run-length is applied for every block of image area, the run-length of the mesh-dot area is longer than that of the character area. That is, since in the character area, the character-to-character pitch is longer than the dot-to-to pitch, the block run-length is short. Thus, the block run-length enables the character area to be discriminated from the mesh-dot area.

A slow-scan-direction edge detector 45 detects an edge or edges in the image area within a range of several blocks as viewed in the slow scan direction. If detected, the image area is a candidate for character. This is done to cope with such a problem that the lateral line frequently used in the character area is also expressed with a long run-length, so that when it is expressed by the run-length in the fast scan direction, it is not a candidate for character.

The combination of an OR gate 48 and an AND gate 49 operates in a manner that if the detect result shows that the candidate for character is present in the fast or slow scan direction, and the maximum flag in the block is "1", the block is determined to be a character area and it allows the block color signal from the block color determining portion 44 to pass therethrough. The maximum flag signal indicates that at least one color pixel, which is determined, by the comparator 42, to be the largest of the color pixels Y, M and C and to be larger than the threshold value $th_{max}$ is present in a block.

The image area identifying system as mentioned above is based on the fact that the run-length in the area near the character is short. The character portion consists of blocks of character and blocks of background, and lies in the background. Accordingly, in the character area, an optical density sharply changes. The image portion lies in the image background, so that the optical density gently changes. Therefore, in the character area, the run-length is short, while in the half-tone image, the run-length is long. When the run-length is applied on the pixel basis, it is difficult to discriminate the mesh-dot area from the character area. However, when the run-length is applied on the block basis, the run-length for the mesh-dots is long. The half-tone image area can be recognized as the half-tone image area, not the character area. With use of the block-basis run-length, the mesh-dot portion of high frequencies tends to appear as a color block having a long run-length. Therefore, it can be treated as the half-tone image area. Use of only the combination of the fast-scan-direction color counter 46 and the comparator 47 for detecting the candidate for character, leads to a mistaken recognition of a line having the run-length long in the fast scan direction. To cope with this problem, the slow-scan-direction edge detector 45 is provided, by which the image area containing edges in the slow scan direction is also treated as a candidate for character. This arrangement ensures a more reliable image area recognition.

Another conventional system is illustrated in FIG. 2B. The instant image area identifying system includes two identifying stages, a primary identifying stage and a secondary identifying stage. In the primary identifying stage, the system detects the maximum and minimum values of a plurality of pixels within a block. Further, the system compares the difference between the maximum and minimum values with a predetermined value, and identifies the image area as a character area on the basis of the comparison result. In the secondary identifying stage, the image-area identifying system corrects the area identification made by the primary identifying stage on the basis of the area determination of its peripheral blocks. To be more specific, for character identification, an (8×8) block generator 61 groups pixels into blocks each consisting of (8×8) pixels. A maximum detector 62 and a minimum detector 63 detect respectively the maximum and minimum values of 8×8 pixels in a block, and an operation circuit 64 calculates the difference between them. A comparator 65 compares the output signal of the operation circuit 64, viz., the difference between the maximum and minimum values, with a threshold value "th". When the difference is larger than the threshold value, it produces a character area signal of logic "1". The secondary identifying stage corrects an error that would be contained in the area identification that is made in the primary identifying stage on the basis of a (3×3) pixel block.

When the primary identifying stage recognizes an intended pixel block as a character area, and most of its peripheral blocks indicate noncharacter area, the secondary identifying stage corrects the error, viz., the mistaken identification and identifies the area as a noncharacter area. In a case that the intended block is identified as a noncharacter area in the primary identifying stage and most of its peripheral blocks indicate character blocks, the secondary identifying stage corrects the error and identifies the area as a character area.

Other image-area identifying systems than those as mentioned above have been proposed. Some of them will be enumerated here. A prior image-area identifying system uses average values and the standard deviation in blocks (Japanese Patent Laid-Open Publication No. Sho. 63-205783). Another prior art uses binary data signals output from a plurality of dither converters with different phases (Japanese Patent Laid-Open Publication No. Sho. 63-193770). In a further prior art (Japanese Patent Publication No. Sho. 63-51631), maximum and minimum values of pixels within a block are detected for the respective separated color signals R, G, and B. If the difference for at least one color signal is larger than a predetermined value, the area is identified as a character area.

The image-area identifying systems as described above indeed succeeds in improving the area identifying performance by using the block-basis area identification. In actual use, however, high speed and high picture quality are constantly demanded. If to meet the demand, an image read speed is increased, the image data that is read must be processed at high speed. Under this condition, if the color image processing apparatus is operated, mechanical vibration and noise will occur, and lead to nonuniform area recognitions in the developing process. The result is broken black characters in the reproduced image.

As already referred to, in the color copying machine, the image is scanned four times, and the toner images of Y, M, C, and K are superposed through the four-time developing processes, for full color image reproduction. When an image area is identified using characteristic values, such as the maximum-minimum difference, run-length, average value, and standard deviation, if the results of the block-basis area identifications in the respective developing processes are different from one another, deterioration of the picture quality of the resultant image is much greater.

For example, in a case that the area is determined to be a black character area in the developing processes for M and C, and the area identification shows that it is not the black character area, the black character is cut in the block under area identification, and the block is output in Y color. In this case, the identification of the black-character for M and C and nonblack-character area for K suppresses the output signals and allows the color signal of Y alone to be output. Particularly, when the identified black character area is reproduced only in K, and the color signals of Y, M and C are reset, and in the identified color character area, the K signal is reset, if the area recognition is incorrect, a color character is frequently changed to a black character or a color is missed to change the color of the resultant image.

When the identified area is a black character area, if the color signals of Y, M and C are reset, the background color is bleached. When it is a color character area, if K is reset, reproduction of blue is extremely deteriorated since in the case of blue, Y and K as well as M and C are valid. A black character on the block-basis area determination is off in places and missing parts of the black character are colored. This tendency is more conspicuous than in the pixel-basis area determination. Such a defect also appears in color images and half-tone images. The quality deterioration of the reproduced image is great.

In conventional systems, the hardware arrangement can be complicated. Even if it is simple, the area identification performance may be unsatisfactory. Particularly, the hardware matching for black/color character identification to comply with color images is technically difficult. This results in a need to use hardware separated from the area identifying system.

SUMMARY OF THE INVENTION

The present invention has been made in view of the above circumstances and has an object to provide an image-area identifying system for a color image processing apparatus which successfully eliminates various defects involved in the blockbasis area determination.

Another object of the present invention is to provide an image-area identifying system for a color image processing apparatus which is free from the blackening of color characters of blue family and color missing.

Yet another object of the present invention is to provide an image-area identifying system for a color image processing apparatus which can adjust a black character in a broad range of black levels, with an excellent black/color discrimination.

Still another object of the present invention is to provide an image-area identifying system for a color image processing apparatus which provides an easy hardware matching for black/color character identification.

A further object of the present invention is to provide an image-area identifying system for a color image processing apparatus which can easily be implemented into hardware.

According to a first aspect of the invention, there is provided an image-area identifying system in use with a color image processing apparatus for processing color image data including characters and half-tone images comprising: image area identifying means for identifying a character area or a half-tone image area by using characteristic values of pixels in each pixel block of an image area; hue determining means for determining, every pixel, hue of received color image data to produce a necessary color switch signal or an unnecessary color switch signal; and data reset means for resetting unnecessary image data on the basis of the results of the block-basis area identifying determination by the image area identifying means and the pixel-basis hue determination by the hue determining means.

With such an arrangement, if the TIS circuit determines the image area to be a character area for each block, whether or not the data is to be reset is determined by a necessary/unnecessary color switch signal from the UCR circuit. Therefore, the defects are remarkably reduced.

According to a second aspect of the invention, there is provided an image-area identifying system for use with a color image processing apparatus for processing color image data containing characters and half-tone images comprising: image-area identifying means for identifying an image area of a character area or a half-tone image area;

first under-color-removal means for normal under-color-removal processing; second under-color-removal means for 100% under-color-removal processing; and selecting means for selecting the output signal of the first under-color-removal means or the output signal of the second under-color-removal means according to an output signal from the image-area identifying means.

In the image-area identifying system thus arranged, the switching between the UCR circuit and the UCR circuit, and the switching of the parameters of the spatial filter are performed for each area on the basis of the area identification result by the TIS circuit. Accordingly, viewers have a little unnatural feeling on the resultant character and half-tone images. An excellent character reproduction can be realized without identifying the character color. Use of the 100% UCR eliminates such defects caused by the character of a single color of perfect black as the character colors belonging to the blue system being blackened, and the color being off in places.

According to a third aspect of the invention, there is provided an image-area identifying system in use with a color image processing apparatus for processing color image data including characters and half-tone images, comprising: image area identifying means for identifying a character area or a half-tone image area by using characteristic values of pixels in each pixel block of an image area; hue determining means for determining, every pixel, hue of received color image data to produce a necessary color switch signal or an unnecessary color switch signal; filter means for smoothing images and for emphasizing edges of character images, the filter means being coupled with the output of the hue determining means for receiving image data and with the image area identifying means for receiving a signal for switching parameters of the filter means and data reset means, coupled with the filter means, for resetting unnecessary image data on the basis of the results of the block-basis area identifying determination by the image area identifying means and the pixel-basis hue determination by the hue determining means.

In the image-area identifying system of the invention, since the data reset is thus controlled by the TRC circuit, the reset characteristic can be controlled, so that the black character level can also be adjusted in a broad range from a perfect black to four-color black character.

According to a fourth aspect of the invention, there is provided an image-area identifying system in use with a color image processing apparatus for processing color image data including characters and half-tone images, comprising: image area identifying means for identifying a character area or a half-tone image area by using characteristic values of pixels in each pixel block of an image area; hue determining means for determining, every pixel, hue of received color image data to produce a necessary color switch signal or an unnecessary color switch signal; selecting means for selecting the type of image according to an output signal of the image area identifying means; and data reset means, coupled with the output of the selecting means, for resetting unnecessary image data on the basis of the result of the block-basis area identifying determination by the image area identifying means.

With the arrangement, the black character is reproduced with a single color of perfect black, and the color character is reproduced with three colors exclusive of black K.

According to a fifth aspect of the invention, there is provided an image-area identifying system in use with a color image processing apparatus for processing color image data including characters and half-tone images, as shown in FIG. 5E, comprising: image area identifying means for identifying a character area or a half-tone image area by using characteristic values of pixels in each pixel block of an image area; character-area classifying means for classifying the character area identified by the image area identifying means into four levels of image area, according to the result of the image area determination made by the image area identifying means; selecting means for selecting the image area classified by the character-area classifying means according to an output signal of the image area identifying means; and filter means for smoothing images and for emphasizing edges of character images, the filter means being coupled with the output of the selecting means for receiving image data and with the image area identifying means for receiving a signal for switching parameters of the filter means.

According to a sixth aspect of the invention, there is provided an image-area identifying device, comprising a three-dimensional look-up table accessed by three characteristic values, "in-block average value" (Pa), "number of in-block high-level pixels" (Ph), and "number of in-block medium-level pixels" (Pm), thereby to produce a character area data signal or a half-tone image data signal.

This is the basic arrangement to identify an image area, character area or a half-tone image area, by using three characteristic values of pixels, Pa, Ph, and Pm.

According to a seventh aspect of the invention, there is provided an image-area identifying device, comprising: nonlinear quantitizers for quantitizing three characteristic values, "in-block average value" (Pa), "number of in-block high-level pixels" (Ph), and "number of in-block medium-level pixels" (Pm) for reducing the quantities of data representing the three characteristic values; and a three-dimensional look-up table accessed by the output data of the nonlinear quantitizers thereby to produce a character area data signal or a half-tone image data signal.

The arrangement successfully reduces the hardware scale of the image-area identifying device by using the nonlinear quantitizers.

According to an eight aspect of the invention, there is provided an image-area identifying device, comprising: first to third nonlinear quantitizers for quantitizing three characteristic values, "in-block average value" (Pa), "number of in-block high-level pixels" (Ph), and "number of in-block medium-level pixels" (Pm) for reducing the quantities of data representing the three characteristic values; a two-dimensional look-up table accessed by the output data of the first to second nonlinear quantitizers a comparator for comparing the output data signal of the two-dimensional look-up table with the output data signal of the third nonlinear quantitizer thereby to produce a character area data signal or a half-tone image data signal.

The arrangement further reduces the hardware scale of the image-area identifying device.

According to a ninth aspect of the invention, there is provided an image-area identifying system for a color image processing apparatus, comprising: a block generator for grouping a plurality of pixels into blocks each consisting of a predetermined number of pixels; an average calculator, coupled with the output of the block generating means, for calculating an average value (Pa) of pixels within a block; a first counter, coupled with the output of the block generating means, for counting the "number of in-block high-level pixels" (Ph); a second counter, coupled with the output of the block generating means for counting the "number of in-block medium-level pixels" (Pm); a first nonlinear quantitizer, coupled with the output the average calculator, for quantitizing a characteristic value of "in-block average value" (Pa); a second nonlinear quantitizer, coupled with the output the first counter, for quantitizing a characteristic value of the "number of in-block high-level pixels" (Ph); a third nonlinear quantitizer, coupled with the output of the second counter, for counting the "number of in-block medium-level pixels" (Pm); a two-dimensional look-up table accessed by the output data of the first to second nonlinear quantitizers; a comparator for comparing the output data signal of the two-dimensional look-up table with the output data signal of the third nonlinear quantitizer; an error corrector for correcting an error contained in the output data signal of the comparator; a block-basis hue discriminator coupled at the input with the output of the block generator; and final determining means of which the input is connected to the output of the error corrector and the output of the block-basis hue discriminator.

The arrangement is a specific image-area identifying system using the third image-area identifying device as stated above.

According to a tenth aspect of the invention, there is provided a hue discriminator, comprising: maximum detecting means for detecting maximum values of three color signals Y, M, and C; minimum detecting means for detecting minimum values of three color signals Y, M, and C; subtracting means for calculating the difference between the maximum and minimum values, and the difference between each of the color signals and the minimum value; comparing means for comparing the output signals of the subtracting means with threshold values, and the output signal of the minimum detecting means; and final decision means for deciding hue on the basis of the output signals of the comparing means.

BRIEF DESCRIPTION OF THE DRAWINGS

The accompanying drawings, which are incorporated in and constitute a part of this specification, illustrate, embodiments of the invention and, together with the description, serve to explain the objects, advantages and principles of the invention. In the drawings.

DETAILED DESCRIPTION OF THE PREFERRED EMBODIMENTS

Description of the preferred embodiments of an imagearea identifying system for a color image processing apparatus will be given in the following order, while referring to the accompanying drawings.

1. IMAGE DATA PROCESSING SYSTEM

A color image processing apparatus for which an imagearea identifying system according to the present invention is applied will be described with reference to FIGS. 3 and 4. In the description, the color image processing apparatus is a color machine.

1.1 Mechanical Construction

The mechanical construction of the color copying machine will first be described with reference to FIG. 3.

Figure 1:
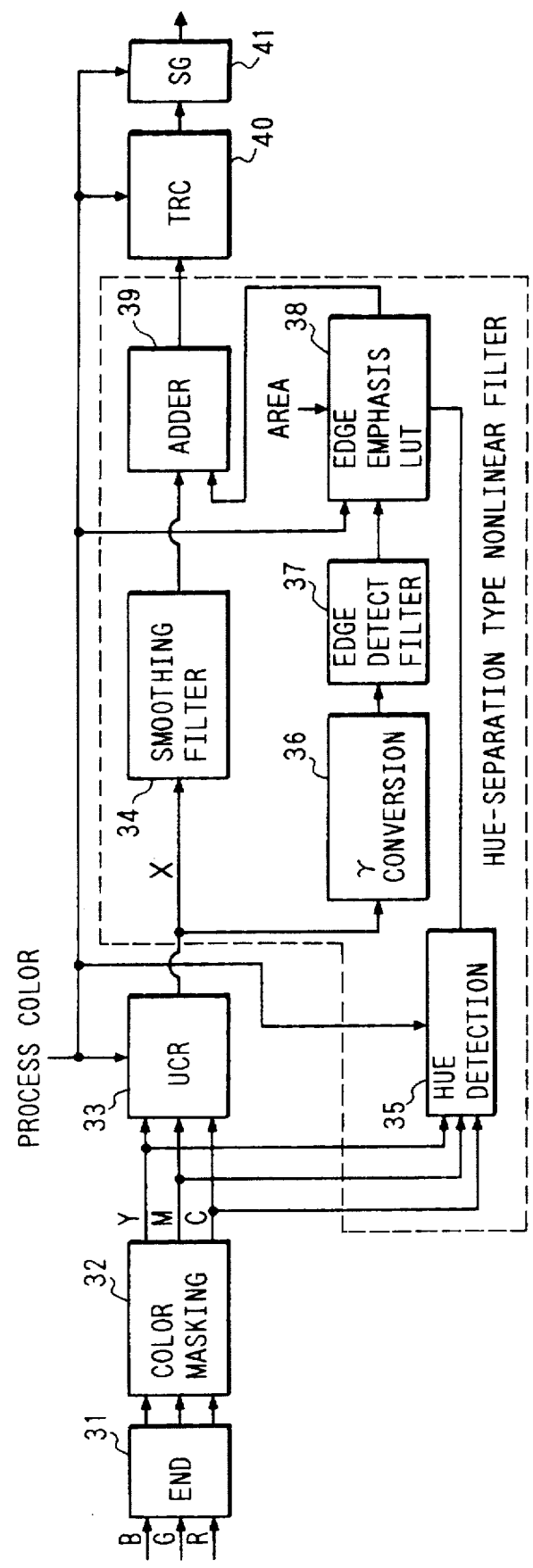
FIG. 1 is a block diagram showing the arrangement of a prior color image processing system.
Figure 2A:
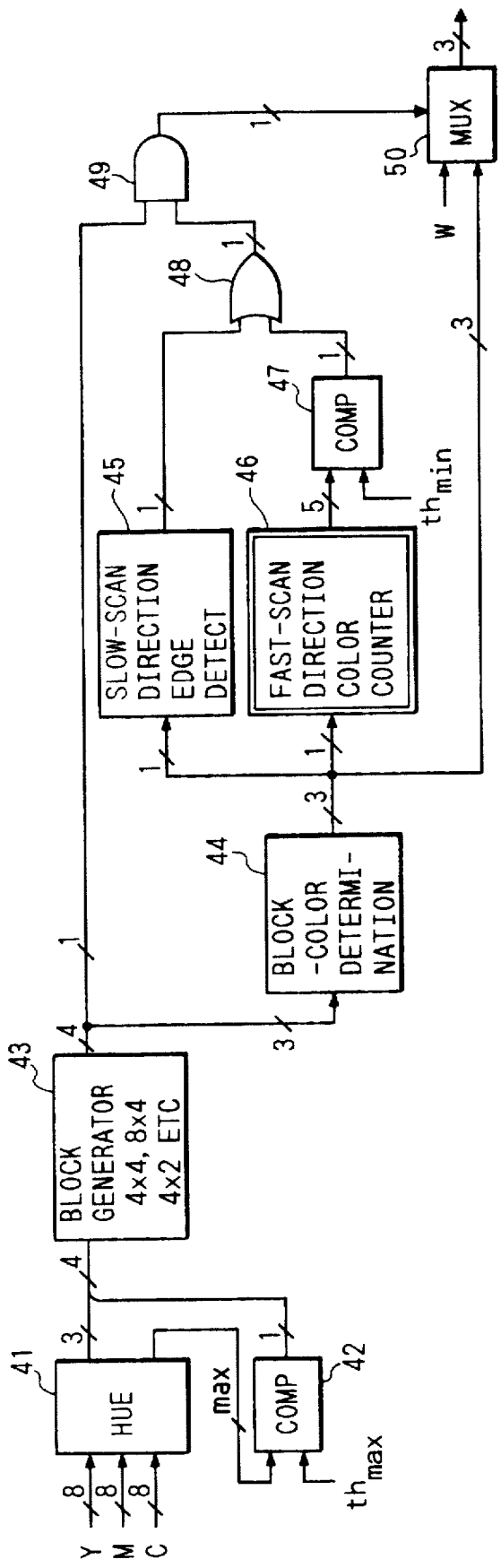
FIG. 2A is a block diagram showing the arrangement of a prior image-area identifying system for a color image processing system.
Figure 2B:
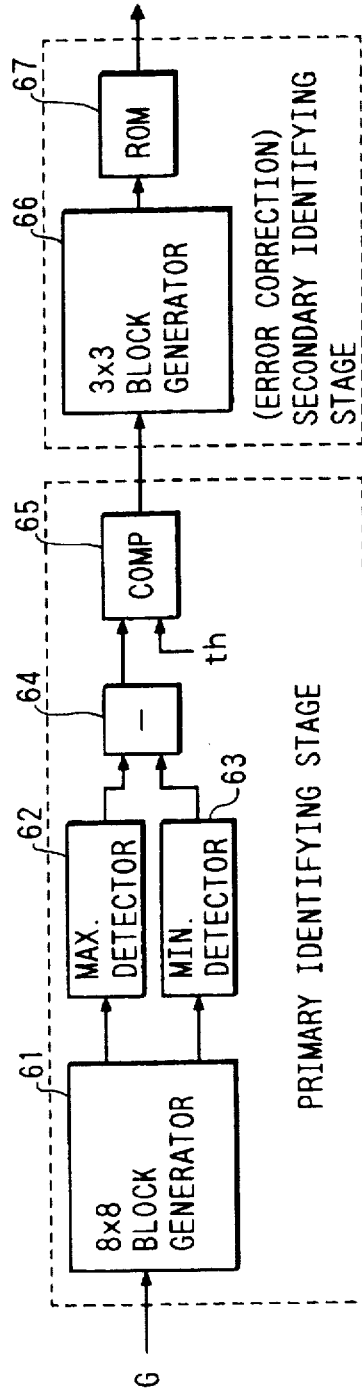
FIG. 2B is a block diagram showing the arrangement of a prior image-area identifying system for a color image processing system.
Figure 3:
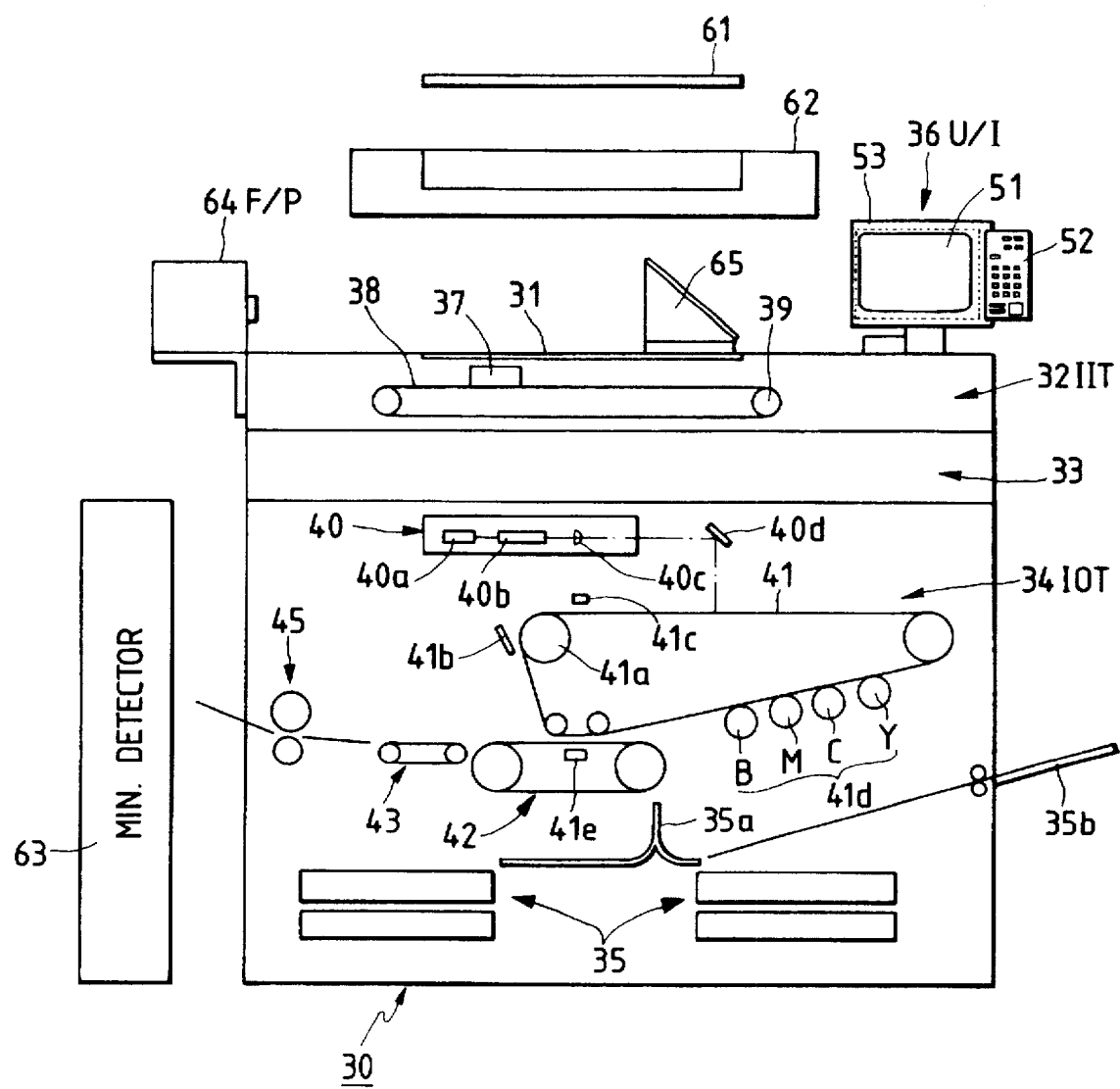
FIG. 3 is a diagrammatic view showing the mechanical construction of a color copying machine to which a character processing system of the invention is applied.

In the color copying machine shown in FIG. 3, a base machine 30 is made up of a platen glass 31 on which an original document is placed, an image input terminal (IIT) 32, an electric-control-board container 33, an image output terminal (IOT) 34, a paper tray 35, and a user interface (U/I) 36. The color copying machine is optionally provided with an edit pad 61, an automatic document feeder (ADF) 62, a sorter 63, and a film image reader having a filter projector (F/P 64 and a mirror unit (M/U) 65.

The IIT 32 includes an imaging unit 37, a wire 38 for driving the imaging unit 37, drive pulleys 39, and the like. In the IIT 32, a color image on a color original document is separated into three primary colors B (blue), G (green), and R (red) by means of filters within the imaging unit 37, and is read by a CCD line sensor. The image data thus obtained is converted into multi-the digital image signals B, G and R, and output to an image processing system. The image processing system, contained in the electric-control-board container 33, receives B, G and R image signals, applies various types of conversion and correction processing operations to those image signals to improve image quality, such as colors, tone and definition, and reproduction performances, and additionally performs edit processing operations of the color image data. Further, the image processing system converts the image colors into the toner primary colors Y (yellow), M (magenta), C (cyan), and K (black), converts tone toner signals of the process colors into on/off or binary-coded signals, and outputs those converted signals to the image output terminal 34. In the IOT 34 including a scanner 40, and a photoreceptor belt 41, the image signals are converted into optical image signals by a laser output unit 40a. The optical image signals are imaged, in the form of a latent electrostatic image corresponding to the original color image, on the photoreceptor belt 41 through the combination of a polygonal mirror 40b, an F/θ lens 40c, and a reflection mirror 40d. The color image thus formed is transferred onto a paper supplied from the paper tray 35, and is output in the form of a color copy.

The IOT 34 includes the photoreceptor belt 41, driven by a drive pulley 41a. A cleaner 41b, a charger 41c, Y, M, C and K developing units 41d, and a transfer unit 41e are disposed around the photoreceptor belt 41. A transfer device 42 is further provided in connection with the transfer unit 41e. The transfer device 42 nips a recording paper supplied through a paper transfer path 35a from the paper tray 35, is rotated four times (in the case of 4-color full copy) to transfer Y, M, C and K latent images on the paper. The paper bearing the four latent images is forwarded through a vacuum transfer unit 43 to a fusing unit 45. After the latent images are fused and fixed on the recording paper, the paper is discharged outside. An SSI (single sheet inserter) 35b allows a user to manually and selectively supply a recording paper into the paper transfer path 35a.

The U/I (user interface) 36 allows the user to select desired functions and to determine the conditions under which to execute the functions. The U/I 36 is provided with a color display 51 and a hard control panel 52. Additional use of an infrared touch board 53 enables the user to directly enter instructions with soft buttons on the screen.

The electric-control-board container 33 contains a plurality of control boards for the IIT 32, IOT 34, U/I 36, image processing system, film projector 64, and the like, an MCB board (machine control board) for controlling the operations of the IOT 34, ADF 62, sorter 63, and the like, and an SYS board for controlling all those units.

1.2 Signal Processing System

A signal processing system incorporated into the color copying machine constructed as shown in FIG. 3 will be described with reference to FIGS. 4A and 4B.

Figure 4A:
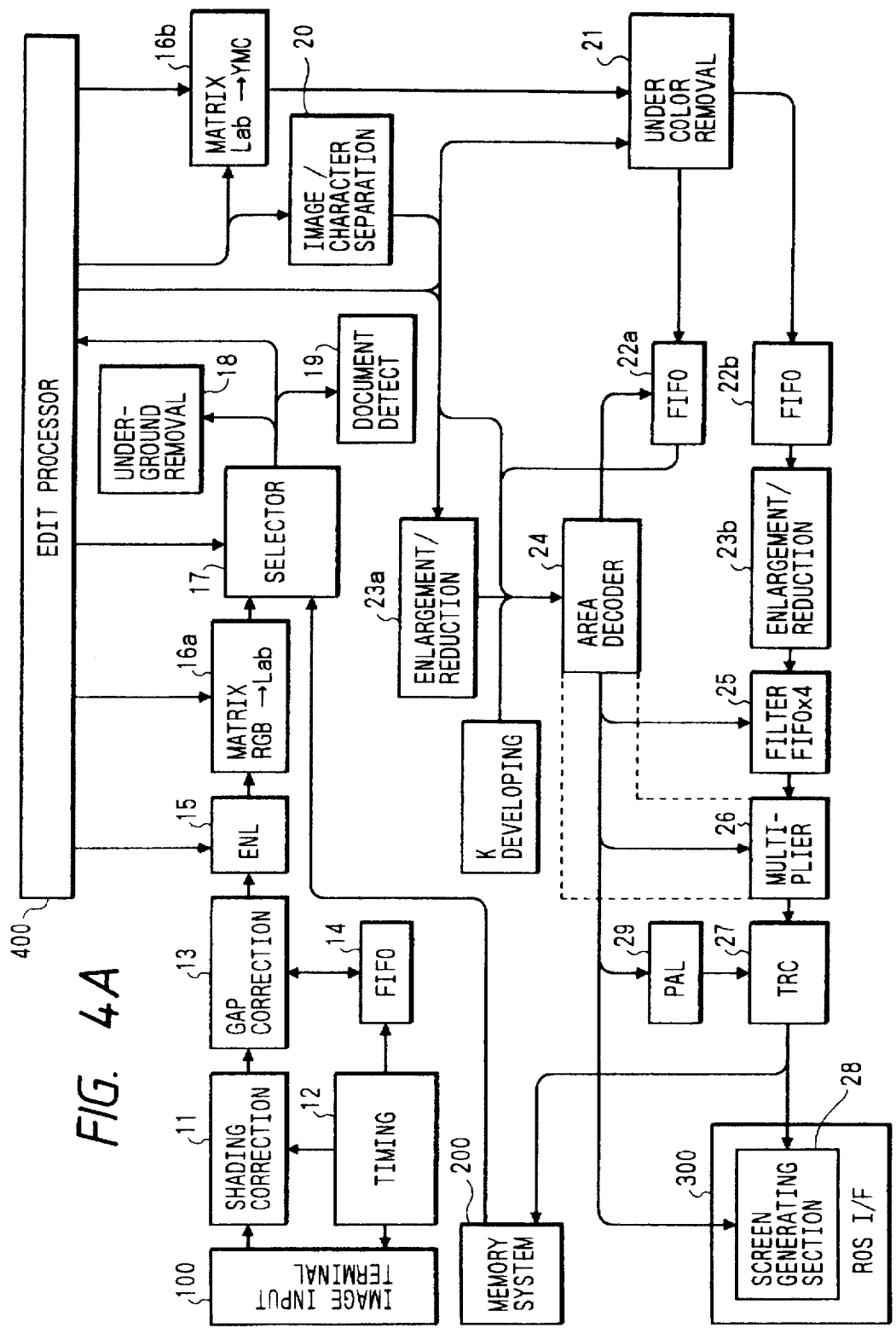
FIGS. 4A and 4B cooperate to show in block form an image data processing system of the color copying machine of FIG. 3.
Figure 4B:
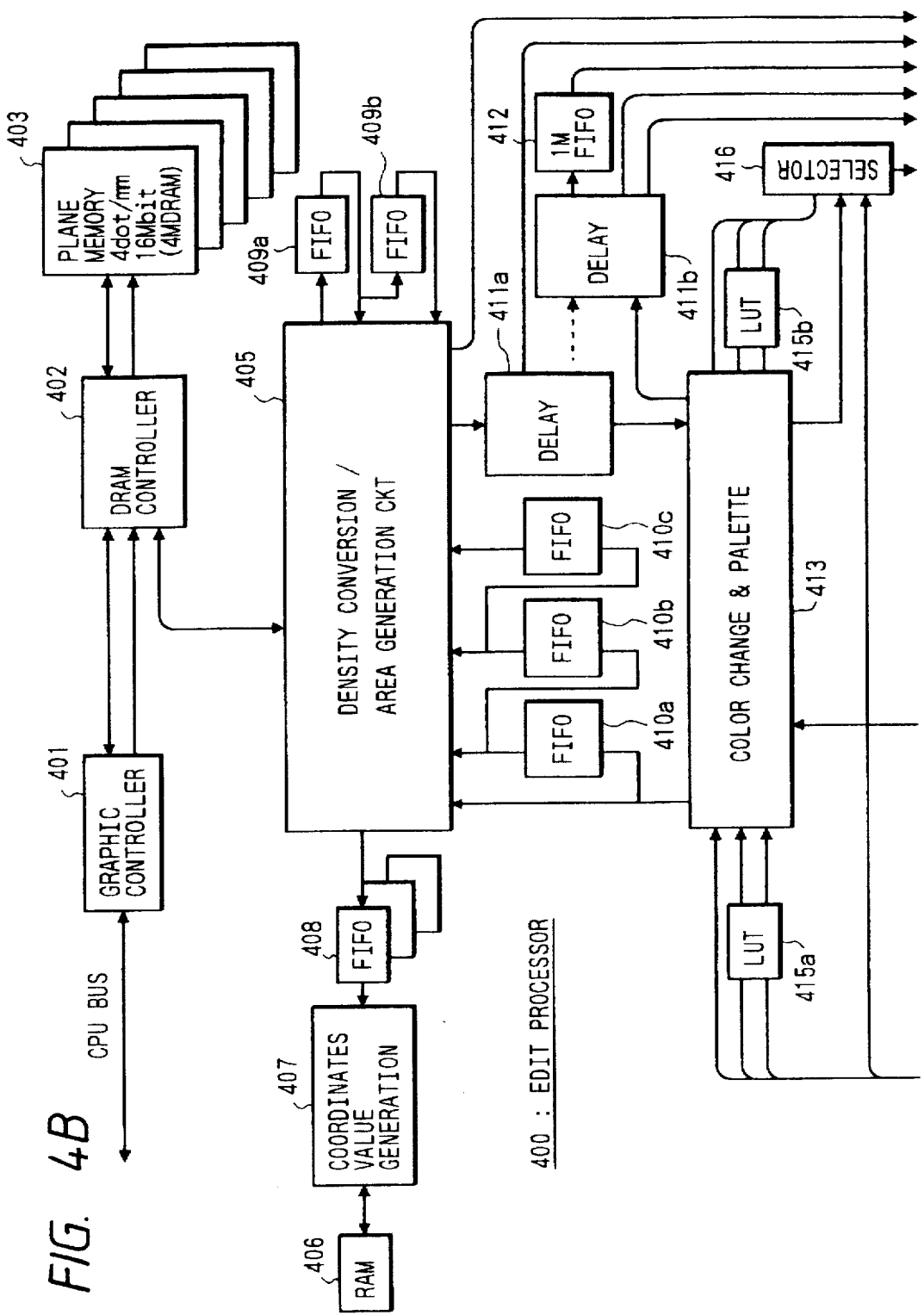

In FIG. 4A, an image input terminal (IIT) 100 contains a size-reduction type sensor which includes three line sensors of R, G and B arrayed orthogonal to the vertical scan direction. The IIT 100 scans in the main scan direction in synchronism with a timing signal from a timing generating circuit 12, while moving in the vertical scan direction at the speed based on the magnification of enlargement and reduction. In the IIT, the analog image data is converted into digital image data of 8 bits, for example, which is expressed in gray levels. The image data suffering from the nonuniformity among the pixels owing to various factors is shading-corrected by a shading correction circuit 11, and applied to a gap correction circuit 13 where gaps among the line sensors are corrected. In the gap correction, the read image data is delayed by the quantities corresponding to the gaps by an FIFO 14 so that the R, G, and B image signals corresponding to the same positions appear at the same time. An ENL (equivalent neutral lightness) converting circuit 15 is provided for gray balancing the image data using the parameters based on the document type. The setting of gray levels in the image signal is inverted every pixel, viz., the negative/positive inversion is performed, by a negative/positive inverting signal from an edit processing unit 400 to be given later. The ENL converting circuit 15 may selectively perform the negative/positive inversion in only a specific image area.

The R, G and B image signals processed by the ENL converting circuit 15 are converted into image signals L*, a*, and b* in a uniform color space by a matrix circuit 16a. Of these signals L*, a*, and b*, the signal L* indicates a value and the signals a*, and b* indicate a chromaticity plane (hue and saturation) in the coordinates system having three coordinate axes. With the conversion of the image signal from R, G and B to L*, a*, and b*, an easy interface of the system with other devices, such as computers through a memory system 200 is realized and the color change, edit processing and image data detection are easy. A selector 17 selects either the output signal of the matrix circuit 16a or the image data from the memory system 200 as an interface with an external computer, or receives both image data to make the texture composition or the spaced composition. To this end, the selector 17 has the function of setting the composition ratio, and the functions of the operation processing, and the composition processing.

An underground removal circuit 18 detects an underground density by preparing a histogram of densities on the document through a prescan, and removes the pixels having densities lower than the detected underground density, thereby to improve the copy quality of fog-contained documents like a newspaper. A document detector 19 detects and stores the size of an original document. To detect the document size, the detector 19 detects the boundary of the reverse side of a black platen, thereby to obtain a rectangular defining the outer peripheral edge of the original. In the underground removal circuit 18 and the document detector 19, the signal L* of those signals L*, a*, and b* is used for representing the value data.

In the edit processor 400 performs the edit processing for each area, sets area commands for switching the parameters, and generates area control signals based on the area commands. Further, it performs the processings of the color edit and color change for the image data, the processing of marker color detection, and the like. The image data thus processed is input to a matrix conversion circuit 16a and an image/character separation circuit (TIS circuit) 20.

The L*, a*, and b* image data signals after edit processed are transformed into the toner colors Y, M and C, by the matrix conversion circuit 16a. The image/character separation circuit 20 groups a plurality of pixels into blocks to identify the area of color character, black character or image (character/halftone). The under-color removal circuit 21 generates black (K) using the image data of Y, M and C output from the matrix conversion circuit 16b according to the signal of monocolor/full color, and subtracts the equal quantities of the Y, M and C image data from the Y, M and C image data, thereby to produce the image data of process colors. Further, it makes a hue determination to generate a hue signal. In identifying the area by the image/character separation circuit 20, since the pixels are grouped into blocks, the area identifying signal is delayed by 12 lines, for example. The FIFOs 22a and 22b are used for synchronizing the hue signal and the image data with the delayed area identifying signal.

An enlargement/reduction circuit 23b enlarges or reduces the size of the image data according to a specified enlargement or reduction rate. The enlargement or reduction of the image data in the vertical scan direction is performed in the IIT (image input terminal) 100, by changing the scanning speed according to the rate of enlargement or reduction. Accordingly, the enlargement/reduction circuit thins out or interpolates the image data in the main scan direction. Another enlargement/reduction circuit 23a is provided for processing area commands for enlargement or reduction so that area control data is applied exactly to the area to which it is to be applied. The area control data after the enlargement or reduction processed is decoded by an area decoder 24, and applied to the decoded data to the respective processing blocks. The area decoder 24 generates, by using the area commands, a hue signal, area identifying signals, signals for switching the parameters of a filter 25 and a TRC circuit 27, the coefficient of a multiplier 26a, and the like, and distributes the generated signals to the related circuits.

The filter 25 processes the enlarged or reduced image data to remove moire in the halftone image and emphasis edges in the character image according to a spatial frequency. The TRC circuit 27 is used for adjusting the density according to the IOT characteristic by using the conversion table. A PAL 29 is a decoder for switching parameters in the conversion table of the TRC circuit 27 by the developing process and area identifying signals. A multiplier 26 operates the expression of "ax+b" where x is image data, and a and b are coefficients. The coefficients are switched to "through" for the halftone, and "high Y" for the characters. This is used in combination with the TRC circuit 27, and performs the data reset and adjusts the colors and density of color and black characters, and image patterns by properly selectively using the coefficients for the respective colors and conversion tables. If the parameters of the filter 25 are standardized, it is possible to make the edge emphasis of the characters by using the coefficients a and b. The adjusted image data is stored in the memory system or output from a screen generator 28 of a ROS 300 in the form of a dot-mesh image.

The edit processor 400 performs the color change and color edit, generates area control signals, and receives the image data L*, a*, and b* from the selector 17. In an LUT 415a FIG. 4B), the chromaticity data is transformed from the data a and b in the orthogonal coordinates system to the data C and H in the polar coordinates system. This is done for providing easy detection of marker and other colors, and to easily render the color edit, color change and the like. A color change and palette 413 contains colors for color change and color edit in 32 number of palettes, and processes the image data L, C and H for marker color detection, color edit, color change and the like according to area commands supplied through a delay circuit 411a. Only the image data in the area to be color changed is processed by the color change and palette 413, and inversely transformed from the data C and H to the data a and b by an LUT 415b. The image data in the other areas than the color-changed area are directly output from a selector 416 and is transferred to the matrix conversion circuit 16b.

The marker colors (three colors) detected from the image data in the color change and palette 413 and the four-bit signal in the closed area are transferred to a density-conversion/area generating circuit 405. In the density conversion/area generating circuit 405, by using FIFOs 410a, 410b and 410c, with a 4×4 window, the image data is binary-coded in such a manner that if more than a predetermined number of a; and black pixels are contained in the sixteen (16) pixels, "1" is assigned to the image data. Through the binary-coding processing, the image density is converted from 400 spi to 100 spi. Marker signals (of closed loop and marker dots) thus generated in the density conversion/area generating circuit 405 are stored into a plane memory 403, through a DRAM controller 402.

To avoid mistakins dusty particles as the marker, the marker dot signal is delayed by the quantity of three (3) lines by means of a FIFO 408, thereby to form a 3×3 window. In a coordinates generating circuit 407, the marker dots are detected and their coordinate values are generated and stored in a RAM 406. To prevent mistaken detection, the marker dot signals, which are also stored into the plane memory 403, are thus processed.

The plane memory 403 stores area commands for color change, color edit, and other area edits. Also from the edit pad, the use may specify an area and write the area command into the specified area. The area command of the area specified from the edit pad is transferred through a CPU bus to a graphic controller 401, and then is written into the plane memory 403 through a DRAM controller 402. The plane memory 403 consists of four memory planes and is capable of storing sixteen (16) types of area commands 0 to 15.

The area commands of 4 bits stored in the plane memory 403 is read out of the memory in synchronism with the outputting operation of the image data. The area command thus read out is used for edit-processing in the color change and palette, and for switching the parameters in the filter 25, multiplier 26, TRC circuit 27, screen generator 28, and the like, through the image data processing system, ENL conversion circuit 15, matrix conversion circuit 16, selector 17, under-color removal circuit 21, and the area decoder 24 (FIG. 4A). When the area command is read out of the plane memory 403, and is used for the edit processing in the color change and palette 413 and for switching the parameters in the image processing system, it is required to convert the density from 100 spi to 400 spi. The density conversion is executed by the density conversion/area generating circuit 405. In the circuit 505, pixels are grouped into 3×3 blocks by using FIFOs 409a and 409b, and the data is interpolated according to the pixel block pattern. In this way, the density conversion from 100 spi to 400 spi is performed so that closed loop curves and the boundaries of edit areas are not zig-zagged Delay circuits 411a and 411b, 1MFIFO 412, and the like are provided for the timing adjustment of the area command to the image data.

2. IMAGE-AREA IDENTIFYING SYSTEM (FIGS. 5 through 10)

Preferred embodiments of an image-area identifying system for a color image processing apparatus according to the present invention will be described with reference to FIGS. 5A through 5E. Distributions of a color character and a half-tone image, a distribution of the character area, and the like will be analytically described with reference to FIGS. 6A through 6E. Some examples of an image-area identifying devices, which are based on the results of the distribution analysis, will be described with reference to FIGS. 7A through 7C. Then, the details of an area identifying system based on the technical idea of the FIG. 7A device, will be described with reference to FIG. 8. Finally, the details of an example of a hue discriminator circuit will be described with reference to FIGS. 9 and 10.

2.1 Image-Area Identifying System (FIGS. 5A through 5E)

Preferred embodiments of an image-area identifying system according to the present invention will be described with reference to FIGS. 5A through 5E. In each embodiment, the image-area identifying system will be described in the form of a black character processing system.

Figure 5A:
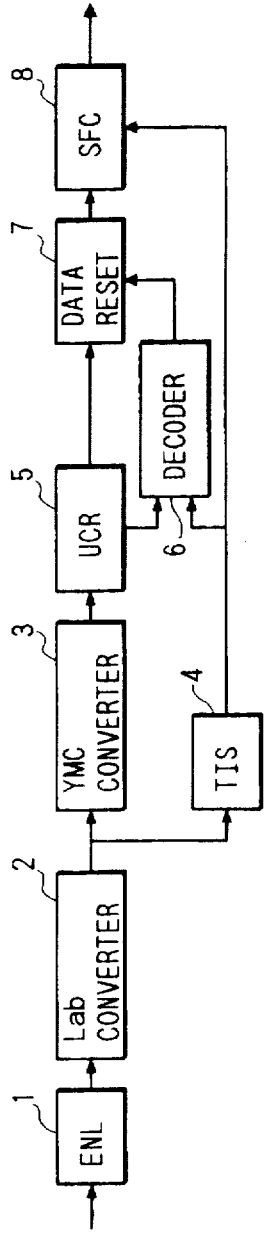
FIGS. 5A to 5E are block diagrams showing the arrangements of five image-area identifying systems according to the present invention.

2.1.1 First image-area identifying system (FIG. 5A)

FIG. 5A is a block diagram of a first embodiment of a black character processing system for the color copying machine according to the present invention. In the figure, an ENL (equivalent neutral lightness) circuit 1 adjusts a gray balance of separated color signals of B, G, and R image signals. When the separated color signals belong to a gray system, those signals are adjusted so as to have equal values. An L* a* b* converter 2 converts the separated color signals of B, G, and R into color signals L*, a*, and b* in a uniform color space, through the matrix operation. Here, L* indicates value or lightness, and a* and b* represent saturation and hue in a chromaticity plane, which is orthogonal to the value axis L*. A YMC converter 3 converts the signals L*, a*, and b* in a uniform color space into coloring material or process color signals Y, M and C, through the matrix operation. A TIS circuit 4 groups a plurality of pixels into blocks consisting of a predetermined number of pixels. The TIS detects characteristic values of the pixels within the block, and identifies a character area or a half-tone image area on the basis of the detected characteristic values. A UCR (under color removal) circuit 5 replaces the equal quantities of the color signals Y, M and C with black K (black generation), while at the same time the quantities of these color signals are correspondingly reduced (undercolor removal). Further, the UCR circuit 5 determines hue of the color signals, and generates a necessary/unnecessary color switch signal. A data reset circuit 7 operates to reset input data to "0". A decoder 6 controls the data reset circuit 7 on the basis of the block-basis area identification by the TIS circuit 4 and pixel-basis hue determination by the UCR circuit, such that only data of the character block and its necessary color (color K for the black character) is passed therethrough, while the other data is reset. When as the result of hue determination, the color signal of K is used for a necessary/unnecessary color switch signal, the data reset circuit 7 allows only the signal K to pass therethrough, while it resets the color signals other than the signal K. An SFC circuit 7 is a spatial filter functioning such that for the half-tone image, it removes moire and mesh-dots to form a smooth half-tone image, and for a character image, it emphasizes edges to form a sharp image. The parameters of the spatial filter are switched on the basis of the character/half-tone image-area identification by the TIS circuit 4.

When the block-basis area identification result is used as it is, if it contains an error, the error will greatly influence the image quality. In the first embodiment, if the TIS circuit 4 determines the image area to be a character area for each block, whether or not the data is to be reset is determined by-a necessary/unnecessary color switch signal from the UCR circuit 5. Therefore, the defects are remarkably reduced.

Thus, in the first embodiment thus arranged, if the TIS circuit 4 identifies an image area as a character area on the block-basis area determination, the data is reset only for the necessary color (K) on the basis of the pixel-basis hue determination. The pixel-basis hue determination determines the background except the character area as the unnecessary color. Therefore, the data of the background is not reset, thereby preventing the background from being bleached.

Figure 5B:
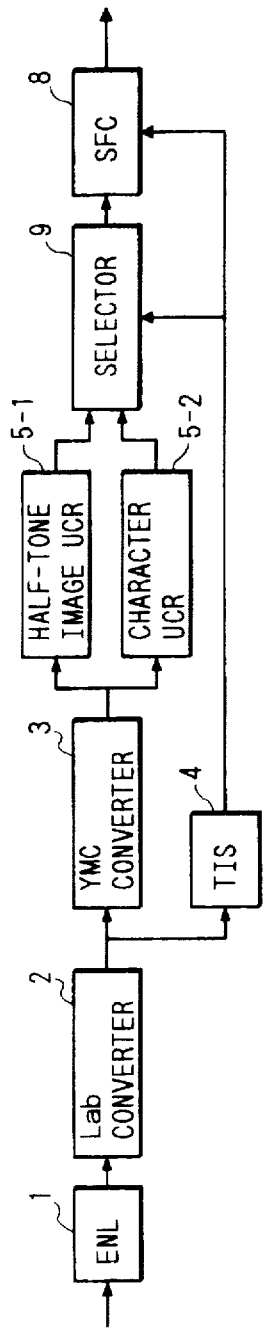

2.1.2 Second Image-area Identifying System (FIG. 5B)

FIG. 5B is a block diagram of a second embodiment of an image-area identifying system, as a black character processing system, for the color copying machine according to the present invention.

As shown, the character processing system of the second embodiment is provided with a half-tone image UCR circuit 5-1 and a character UCR circuit 5-2. A selector 9 selects one of the output signals of the UCR circuits 5-1 and 5-2 on the basis of the result of the area identification by the TIS circuit 4. In the half-tone image, such as photograph, if the image certains excessive black the color becomes impure, losing clarity. To avoid this, black is gradually mixed into the image. The UCR circuit 5-1 takes charge of the processing for the conventional under-color-removal. The UCR circuit 5-2 takes charge of the processing for the 100% under-color-removal; min (y, m, c) for K, and y−min (y, m, c) for each of Y, M, and C. On the basis of the result of the area identification by the TIS circuit 4, the selector 9 selects the output signal of the UCR circuit 5-1 or the output signal of the UCR circuit 5-2. When the half-tone image area is identified, the selector 9 selects the output signal of the UCR circuit 5-1. When the character area is identified, it selects the output signal of the UCR circuit 5-2. The parameters of the SFC circuit 8 are switched depending on the result of the area identification by the TIS circuit 4.

In the image-area identifying system thus arranged, the switching between the UCR circuit 5-1 and the UCR circuit 5-2, and the switching of the parameters of the spatial filter 8 are performed for each area on the basis of the area identification result by the TIS circuit 4. Accordingly, viewers perceive an unnatural feel for the resultant character and half-tone images. An excellent character reproduction can be realized without identifying the character color. Use of 100% UCR eliminates such defects caused by the character of a single color of perfect black as the character colors belonging to the blue system being blackened, and the color being off in places.

Figure 5C:
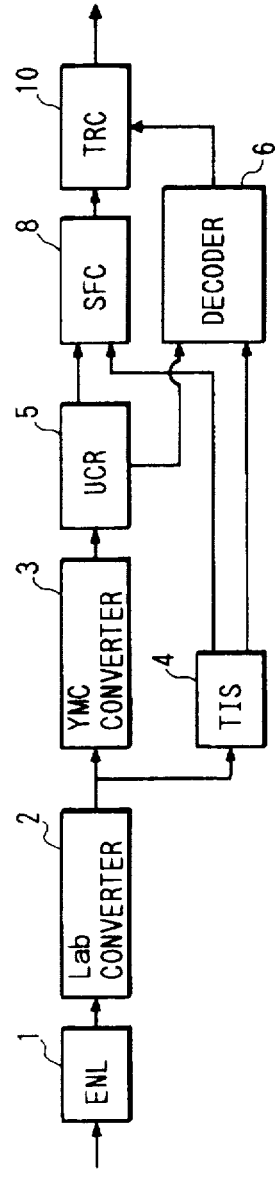

2.1.3 Third Image-area Identifying System (FIG. 5C)

FIG. 5C shows the arrangement of a third embodiment of a black character processing system for a color image processing apparatus according to the present invention.

In the figure, a TRC (tone reduction control) circuit 10 for tone adjustment, which follows an SFC circuit 8, is used for the data reset circuit. The TRC circuit 10 is controlled for data reset by the decoder 6. When the data reset is thus controlled by the TRC circuit 10, the reset characteristic can be controlled, so that the black character level can also be adjusted in a broad range from a perfect black to four-color black character. For a block area that is identified as a character area irrespective of black and color by the TIS circuit 4, the data is reset for each pixel by a necessary/unnecessary color switch signal (hue signal) that is output from the UCR circuit 5. The pixel-basis identification is better than the block-basis identification, in order to reduce the influence of an error that would occur in the black/color identifying operation.

Figure 5D:
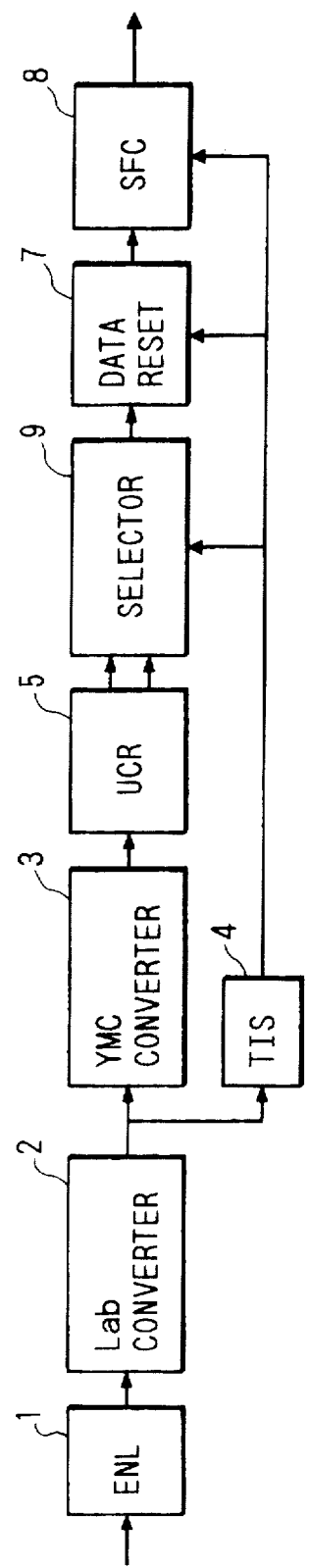

2.1.4 Fourth Image-area Identifying System (FIG. 5D)

FIG. 5D is a block diagram showing an arrangement of a fourth embodiment of a black character processing system for a color image processing apparatus according to the present invention.

In the character processing system, when the TIS circuit 4 determines the image area as a character area irrespective of the black or color thereof, only the signal K is output, while the signals of Y, M and C are reset. When the TIS circuit 4 determines the image area as a color character, three color signals of Y, M and C are output, while the signal of K is reset. Consequently, the black character is reproduced with a single color of perfect black, and the color character is reproduced with three colors exclusive of black K.

Figure 5E:
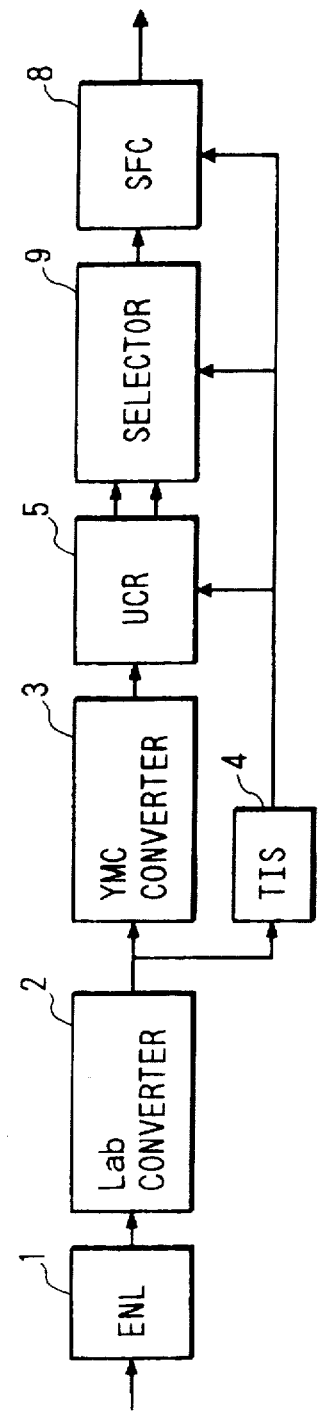

2.1.5 Fifth Image-area Identifying System (FIG. 5E)

FIG. 5E is a block diagram showing an arrangement of a fifth embodiment of a black character processing system for a color image processing apparatus according to the present invention. In the character processing system, a block area that the TIS circuit 4 identifies as a character area irrespective of black or color thereof is subjected, for each pixel, to a black/color character four-level separation processing. The algorithm of the black/color character four-level separation processing consists of a step of checking in which of four levels an intended pixel is, perfect black character level, less black character level, low saturation character level, and high saturation character level, and a step of producing an output signal, which represents one of a single black, a 100% UCR, a normal UCR, and a three-color, which respectively correspond to the above four pixel levels.

2.2 Character/Half-Tone Image Distribution (FIGS. 6A through 6E)

Figure 6A:
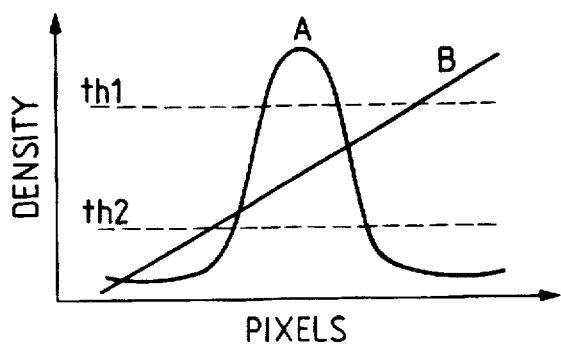
FIG. 6A is a graph showing distributions of a character area and a half-tone image area in an optical-density vs. pixel plane.
Figure 6B:
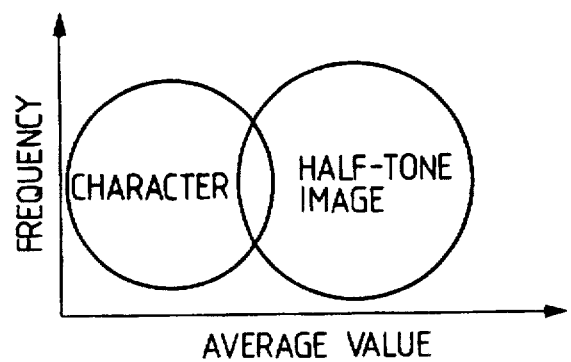
FIG. 6B is a graph showing distributions of a character area and a half-tone image area in a frequency vs. average-value plane.
Figure 6C:
FIG. 6C is a diagram showing a data format of one pixel data stored in a block generating FIFO.

Let us consider an original document having an image containing both characters and half-tone images. In a graph shown in FIG. 6A, an optical density (denoted as A) of a character area sharply rises from a low level of the background. This indicates that the character contains a great number of pixels of high and low densities being respectively above a high threshold level th1 and below a low threshold level th2, and a less number of pixels of medium levels between the high and low threshold levels th1 and th2. The number of low density pixels of the background is larger than that of the high density pixels of the character area. A density of the half-tone image is distributed uniformly over the range from low to high levels, as indicated by a straight line B. The density distribution of half-tone image may be divided into distribution regions; a region ranging over low and high levels, a region of a medium level, a region ranging over medium and high levels, and a region of a high level. In a frequency-average value (in-block average value Pa) plane, an image area is depicted as shown in FIG. 6B. As seen, the character area is distributed in the region of low average values, and the half-tone image is distributed in the region of high average values.

The image data of character/half-tone image will be described in terms of the characteristic quantities.

With regard to the in-block average value Pa, the character area is distributed in the region of low average values Pa, because the number of the pixels of the background is larger than that of the pixels of the character portion.

With regard to the "number of in-block high-level pixels" Ph, it represents the total number of high level pixels within a block in a case where the pixel signal is quantitized into a plurality of levels (e.g., low, medium, and high levels). Accordingly, the character area should contain at least one high level pixel, and at least one low level pixel. If this condition is not satisfied, for example, if the pixels in the block are all in the high level, the image area is the half-tone image area. With regard to the "number of in-block medium-level pixels" Pm, it represents the total number of medium level pixels within a block in a case where the pixel signal is quantitized into a plurality of levels (e.g., low, medium, and high levels). Accordingly, the value Pm is small in the character area where the density distribution sharply changes in the area.

Figure 6D:
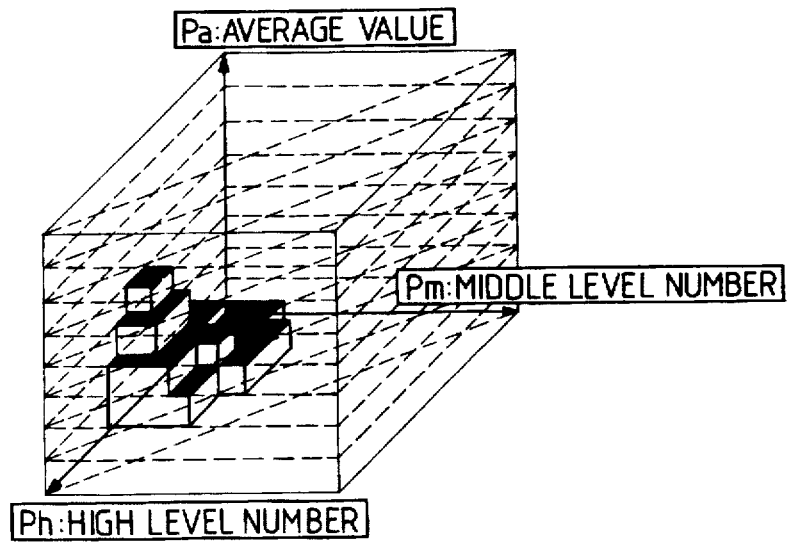
FIG. 6D is a graph showing a distribution of a character area in a three dimensional space defined by three characteristic values of the image data.

The three characteristic quantities Pa, Ph, and Pm may be three-dimensionally arranged, as shown in FIG. 6D. As seen, a character area is relatively clearly defined by the combination of those characteristic quantities.

The character area must satisfy the following conditions.

(1) $Ph+Pm \leq Pt-1$ (2) $1 \leq Ph \leq Pt-1$.

where the total number of pixels within a block is Pt.

Figure 6E:
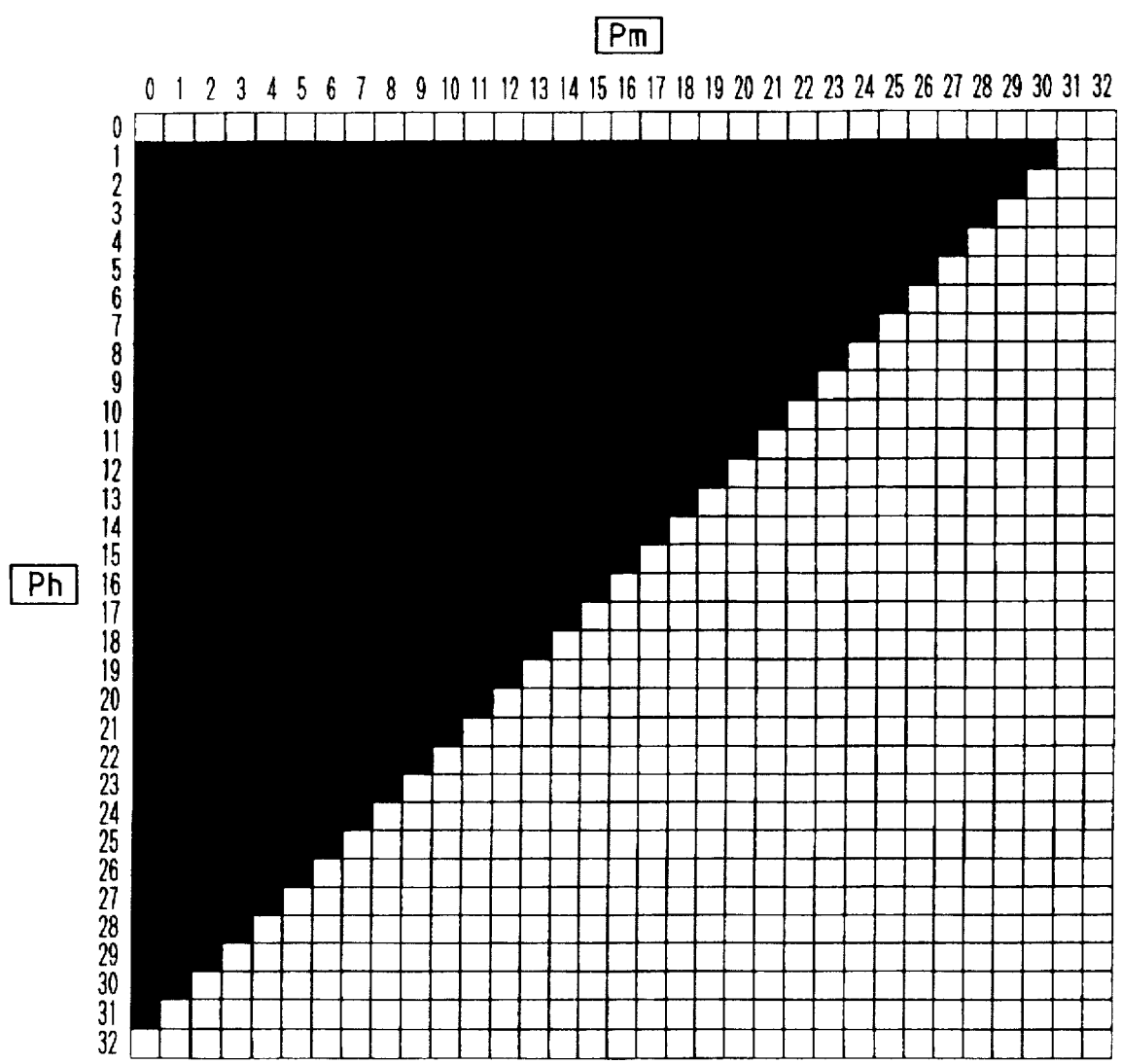
FIG. 6E is an explanatory diagram showing a two dimensional plane defined by two characteristic values of the image data.

In a plane defined by the values Ph and Pm, the character area is distributed in a black section shown in FIG. 6E, and the half-tone image is distributed in a white section. Accordingly, the image area is determined as the character area only when the first and second conditions (1) and (2) are both satisfied.

Actual identification parameters are determined by statistically analyzing the respective image data and allowing for the two conditions above.

As already stated, there are many proposals to collect characteristic quantities of character half-tone image areas within a block area in an image on an original document, which the image contains binary images, such as line images and characters, and half-tone images, such as photograph and mesh-dots.

Those proposals each use one specific type of character quantity, such as run-length and the difference between the maximum and minimum values. It is noted that to identify an image area, the present invention uses three types of characteristic quantities, an average value Pa within a block consisting of a predetermined number of pixels, the number Ph of pixels within one block, and the number Pm of medium-level pixels within one block. In other words, the invention identifies an image area using a three-dimensional distribution defined by the three characteristic quantities. Basic arrangements of the image-area identifying system to implement this idea for the image-area identification of the invention will be described with reference to FIGS. 7A to 7C.

2.3 Image-area Identifying Devices (FIGS. 7A through 7E)

Figure 7A:
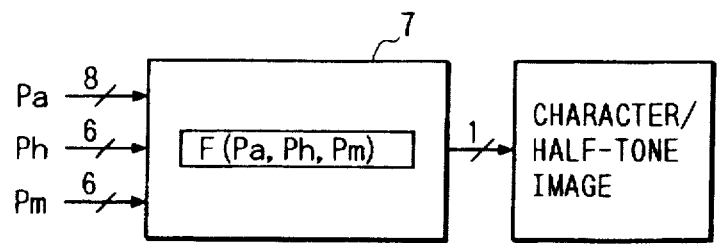
FIGS. 7A to 7C are block diagrams showing image-area identifying devices constructed on the basis of the analysis of the image-area distributions.

In the arrangement to identify an image area shown in FIG. 7A, a three-dimensional (3-D) LUT 7 is used, which previously stores image-area identification results. The LUT 7 is accessed with address data of 20 bits long, which is the combination of the in-block average value Pa, the "number of in-block high-level pixels" Ph, and the "number of in-block medium-level pixels" Pm. With the address data, the 3-D LUT 7 is driven to produce an area determination signal of character/half-tone image.

Figure 7B:
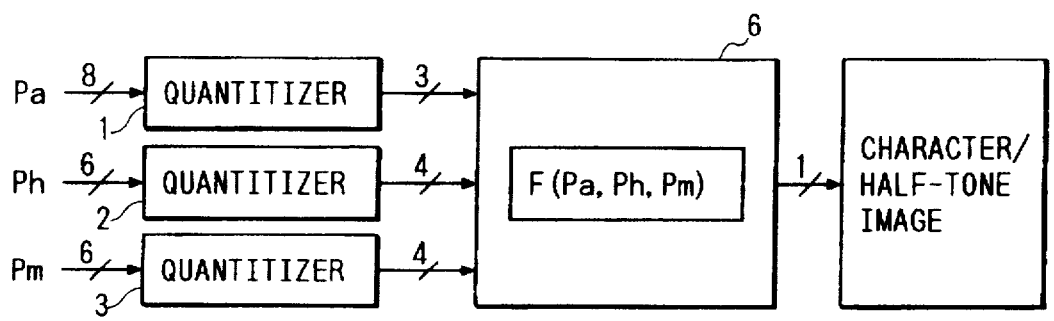

In the arrangement of FIG. 7B, quantitizers 1 to 3 receiving the values Pa, Ph, and Pm are located at the prestage of a 3-D LUT 6. To obtain an image-area determination signal of character/half-tone image, the LUT 6 is addressed with the data as the combination of the values Pa, Ph, and Pm. The quantitizers 1 to 3 are provided for reducing the capacity of the LUT. The reduction of the memory capacity is required when the area identification system is fabricated into an LSI. The quantitizers 1, 2, and 3 convert the 8-bit, 6-bit, and 6-bit data Pa, Ph, and Pm into the 3-bit, 4-bit, and 4-bit data, totally 11 bits. Thus, the instant arrangement succeeds in reducing the data of 20 bits long to data of 11 bits long. However, simple and easy application of the quantitizing technique for the memory capacity reduction fails to reduce the memory capacity. To realize the memory capacity reduction by this technique, it is necessary to use nonlinear distribution of the values Pa, Ph, and Pm, and nonlinear quantitization thereof. Then, the memory capacity reduction of this instance will have little influence on the area identification performance. This fact was empirically confirmed by the inventors.

Figure 7C:
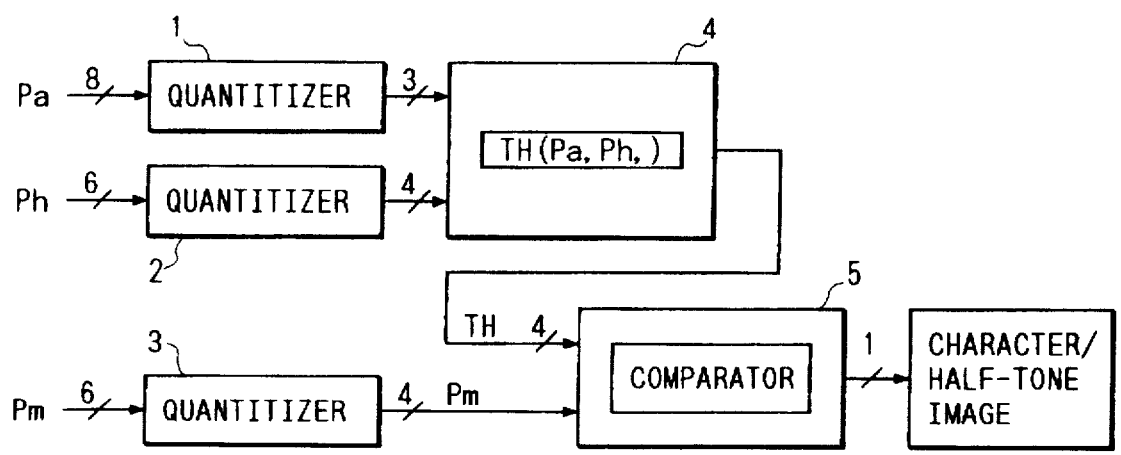

In the arrangement of FIG. 7C, quantitizers 1 and 2 respectively receiving the in-block average value Pa of 8 bits and "number of in-block high-level pixels" Ph of 6 bits are coupled with an LUT 4. A quantitizer 3 receiving the "number of in-block medium-level pixels" Pm of 6 bits is coupled with a comparator 5. The comparator 5 receives the output signal of the LUT 4 and the output signal of the quantitizer 3. The quantitizers 1, 2, and 3 quantitize the input data Pa, Ph and Pm of 8 bits, 6 bits, and 6 bits into data of 3 bits, 4 bits, and 4 bits, respectively. With address data of 7 bits as the combination of data Pa and Ph, the LUT 4 is driven to produce a threshold value TH. The comparator 5 compares the threshold value TH thus read out with the data Pm output from the quantitizer 3, whereby it produces an image-area determination signal of character/half-tone image.

The instant arrangement further reduces the scale of the hardware by utilizing the characteristic of the "number of in-block medium-level pixels" Pm. To this end, the arrangement uses one 2-D LUT and one comparator. The distribution of the value Pm in the character area is necessarily within the range between Pm=0 as the minimum and Pm≤Pt−Ph−1 as the maximum in FIGS. 6D and 6E. Accordingly, if the value Pm is smaller than a preset maximum of the value Pm, the image area can be determined as the character area, and if the former is larger than the latter, it can be determined as the half-tone image area. Thus, the hardware scale can be reduced.

Figure 8:
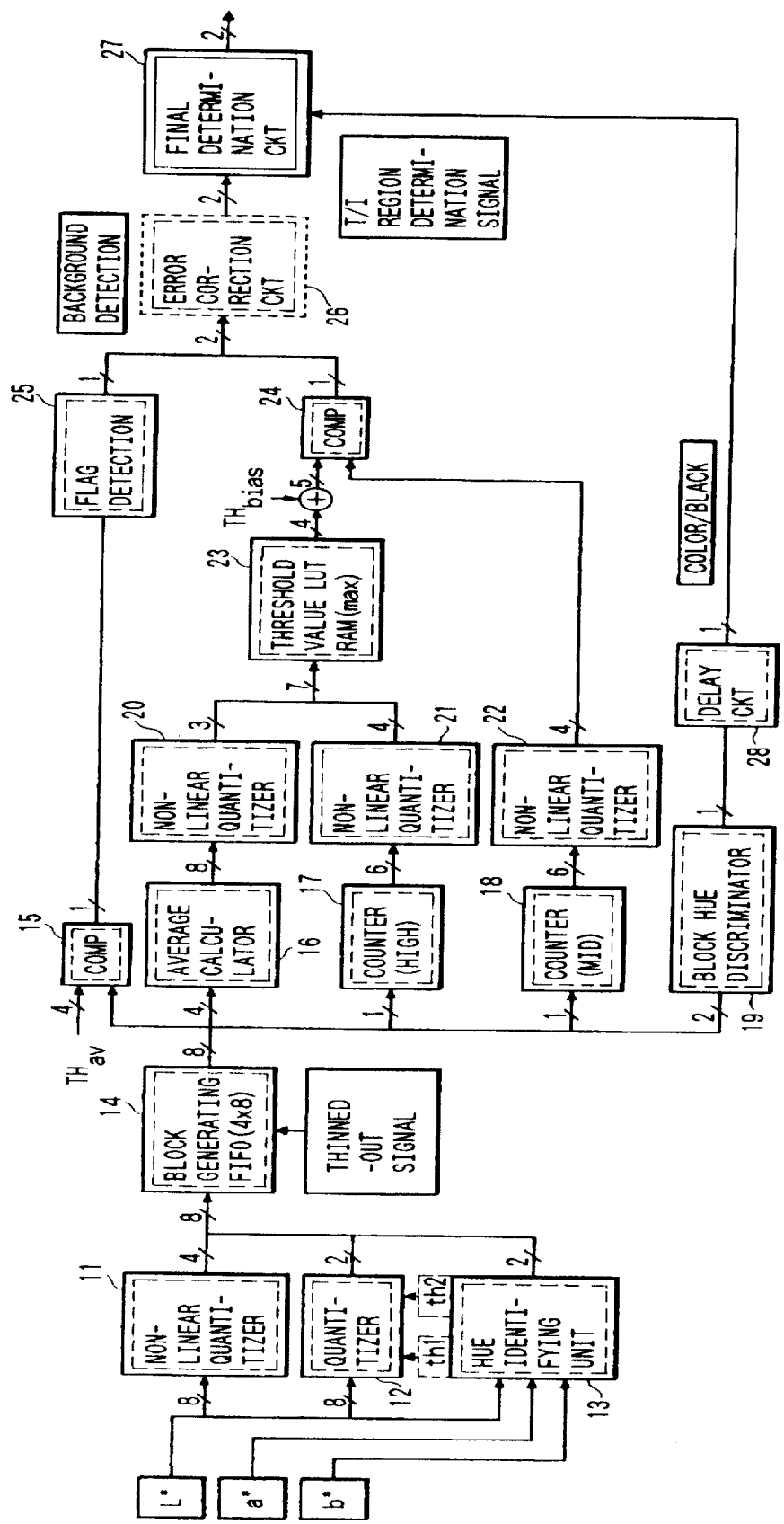
FIG. 8 is a block diagram showing in detail a specific example of an image-area identifying system constructed on the basis of the technical idea of FIG. 7C.

2.4 Details of an Image-area Identifying System (FIG. 8)

FIG. 8 is a block diagram of a specific arrangement of an image-area identifying system which is designed on the basis of the technical idea of FIG. 7C.

In FIG. 8, input data signals L*, a*, and b*are 8 data signals expressed in terms of system values. The L*axis represents value, and the axes a*, and b*represent saturation and hue in a two-dimensional plane. In the figure, a nonlinear quantitizer 11 compresses the 8-bit data signal L*of each pixel to 4-bit data. A quantitizer 12 receives the 8-bit pixel signal L*, determines the level, i.e., low, medium, and high levels, of the pixel signal, and produces the result in the form of a 2-bit signal. Incidentally, the pixel signal is divided into three levels, low, medium, and high levels, with respect to the threshold values th1 and th2. A hue identifying unit 13 receives the 8-bit pixel signals L*, a*, and b*, identifies color, black or white, and outputs the result in the form of a hue signal of 2 bits.

A block generating FIFO 14 stores pixel data consisting of 4 pixels in the slow scan direction and 8 pixels in the fast scan direction, and groups the pixels into blocks each having 4×8 pixels. The same also holds data of 4 lines selected from 8 number of input lines, and groups pixels into blocks each consisting of 8×8 pixels. A thin-out grouping method is used for increasing the block size in order to improve the identification accuracy. The data of one pixel, stored in the FIFO 14, is 8 bits, insize and includes the 4-bit signal L*, 2-bit level signal, and 2-bit hue signal. The 4-bit signal L* is applied to an average calculator 16 and a comparator 15. The 2-bit level signal is applied to counters 17 and 18. The 2-bit hue signal is applied to a block hue discriminator 19.

The average calculator 16 adds together the signals L* of pixels within a block to produce an in-block average value Pa. The counter 17 counts the level signals to produce a "number of in-block high-level pixels" Ph. The counter 18 counts the received signal to produce a "number of in-block medium-level pixels" Pm. The quantitizer 12 operates as follows. When the signal L* is between the threshold value th1 of low level and the threshold value th2 of high level, it sets the lower order bit of the 2-bit data to "1". When the signal L* is in excess of the threshold th2, only the upper order bit is set to "1". Thus, the counter 17 counts the upper order bits, and the counter 18 counts the lower order bits.

The image-area identifying system compresses the data thus processed by nonlinear quantitizers 20 to 22 in a same way as the quantitizers 1 to 3 in the FIG. 7C arrangement, and determines whether the data is character or half-tone image, through the combination of an LUT 23 and a comparator 24. The threshold value Pm of the blocks indicated by solid lines that are treated as the character area in the Pa−Ph plane (located on the left side in the drawing) in the 3-D space shown in FIG. 6D, is read out of the LUT 23. When the comparator 24 determines that the threshold value read out is larger than the compared value, it falls within the 3-D space of FIG. 6D. Under this condition, a determination signal representing the character area is produced. An adder is inserted between the LUT 23 and the comparator 24. The adder is provided for adjusting the bias for the threshold value read out of the LUT 23 with bias $TH_{bias}$, and thence adjusts the area of character.

The comparator 15 and a flag detector 25 are used for detecting background blocks. The comparator 15 compares the 4-bit signal L* with a threshold value THav, and the flag detector 25 detects a pixel or pixels exceeding the threshold value THav that are contained in the block. When all the pixels in the block are smaller than the threshold value THav, the block is determined as the background. In other words, the block not containing at least one pixel exceeding the threshold value THav is determined as the background, neither the character or the half-tone image. An error correction circuit 26 receives a character/half-tone image determination signal and a background detect signal, and makes the correction for a larger block in comparison with determination signals on blocks around the block under image-area identification. Finally, it produces a character/half-tone image determination signal.

The block hue discriminator 19 receives a hue signal of each pixel in the pixel block that is output from the block generating FIFO 14, and discriminates color, black, or white of the pixels every block on the basis of the decision by majority. A delay circuit 28 delays a block hue signal of color, black or white to synchronize it with the character/half-tone image determination signal output from the error correction circuit 26. A final determination circuit 27 receives the character/half-tone image determination circuit and the block hue signal of color/black/white, and finally produces a T/I (text image) area determination signal of color character, black character, or half-tone image, that is determined on the basis of the received signals.

Figures 9, 10:
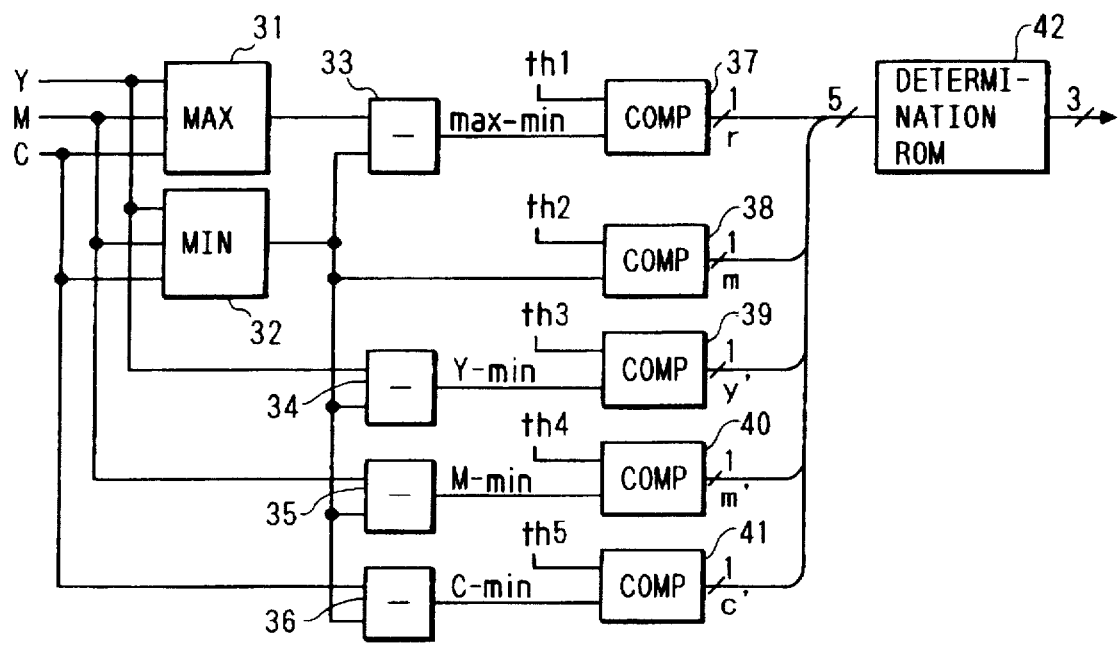
FIG. 9 is a block diagram showing a hue discriminator circuit.
FIG. 10 is a table showing the conditions of determining hues.

2.5 Hue Discriminator Circuit (FIGS. 9 and 10)

A specific example of the hue discriminator will be described. FIG. 9 is a block diagram showing an arrangement of the hue discriminator. FIG. 10 is a table describing the conditions for determining various hues.

As shown in FIG. 9, the hue discriminator includes a maximum circuit 31 for detecting maximum values of the color signals Y, M and C, a minimum circuit 32 for detecting minimum values of those color signals, a subtractor 33 for calculating the differences of the maximum and minimum values, subtractors 34 to 36 for calculating the differences between the minimum value and the color signals of Y, M and C, and comparators 37 to 41. The comparator 37 compares the output signal (max.–min.) of the subtractor 33 and the threshold value th1. The comparator 38 compares the minimum signal (min.) and the threshold value th2. The comparator 39 compares the output signal (Y–min.) of the subtractor 34 and the threshold value th4. The comparator 41 compares the output signal (C–min.) of the subtractor 34 and the threshold value th5. When those output signals are greater than the threshold values th1 to th5, the comparators produce signals r, m, c', m', and y' each of logic "1". These output signals are applied to the hue determining table shown in FIG. 10, to provide determined hues. That is, the process color is determined as a necessary color of "1" or an unnecessary color of "0". The determined colors are eight colors usually used for character colors, W (white), Y, M, C, B, G, R, and K. It is a determination ROM 42 that makes the hue determination shown in Table of FIG. 10 on the basis of the output signals of the comparators 27 to 41.

3. EFFECTS OF THE INVENTION

As seen from the foregoing description, the character identification system of the invention identifies the image area of character or half-tone image for each block consisting of a plurality of pixels. Further, it determines the hue for each pixel to control the resetting of the process color signals Y, M, C, and K. Therefore, it eliminates defects caused when the image-area identification is based on only a block-basis image-area determination. The black character level can be adjusted over a broad range by controlling the data reset characteristic by the TRC circuit. Further, a character can be reproduced at a high quality without identifying the character color, by switching the UCR processing signal respectively for the character and the halftone image.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A color image processing apparatus for processing image data including characters and half-tone images, said apparatus comprising:

image block type identifying means for dividing said image data into blocks of pixels and for determining, for each block, whether said each block is of a character type or a half-tone image type, by using characteristic values of pixels in said each block;

hue determining means for determining, for each pixel at least within blocks identified as said character type, hue of received color image data to produce a color switch signal, said switch signal indicating which color components are necessary or unnecessary within said blocks identified as said character type; and data reset means for resetting unnecessary color component portions of image data corresponding to blocks identified as said character type on the basis of the types identified by said image block type identifying means and the color switch signal produced by said hue determining means.

2. The color image Processing apparatus according to claim 1, further comprising interpret/control means for interpreting the result of the types identified by said image block type identifying means and the color switch signal produced by said hue determining means and for controlling said data reset means on the basis of the interpretation results.

3. The color image processing apparatus according to claim 1, further comprising:

first converting means for converting color image signals into color image signals in a uniform color space, said first converting means being coupled for transmission with said image block type identifying means; and second converting means for converting the image signals from said first converting means into process color signals, said second converting means being coupled for transmission with said hue determining means.

4. The color image processing apparatus according to claim 1, further comprising filter means for smoothing images and for emphasizing edges of character images, said filter means being coupled with the output of said data reset means for receiving image data and with said image block type identifying means for receiving a signal for switching parameters of said filter means.

5. The color image processing apparatus according to claim 1, in which said hue determining means is an under color-removal-circuit.

6. The color image processing apparatus according to claim 1, further comprising:

character-area analyzing means for determining a kind of a character type block identified by said image block type identifying means according to the result of the image block type determination made by said image block type identifying means;

selecting means for selecting among kinds of character image data based on said kind of said character type block, according to an output signal from said image block type identifying means; and filter means for smoothing images and for emphasizing edges of character images, said filter means being coupled with the output of said selecting means for receiving image data and with said image block type identifying means for receiving a signal for switching parameters of said filter means.

7. The color image processing apparatus according to claim 6, further comprising:

first converting means for converting color image signals into color image signals in a uniform color space, said first converting means being coupled for transmission with said image block type identifying means; and second converting means for converting the image signals from said first converting means into process color signals, said second converting means being coupled for transmission with said determining means.

8. The color image processing apparatus according to claim 1, wherein said data reset means includes means for performing resetting in each pixel.

9. A color image processing apparatus for processing color image data including characters and half-tone images, said apparatus comprising:

image block type identifying means for dividing said image data into blocks of pixels and for determining, for each block, whether said each block is of a character type or a half-tone image type, by using characteristic values of pixels in said each block;

hue determining means for determining, for each pixel at least within blocks identified as said character type, hue of received color image data to produce a color switch signal, said switch signal indicating which color components are necessary or unnecessary within said blocks identified as said character type;

data reset means for resetting unnecessary color component portions of image data corresponding to blocks identified as said character type on the basis of the types identified by said image block type identifying means and the color switch signal produced by said hue determining means;

interpret/control means for interpreting the results of the types identified by said image block type identifying means and the color switch signal produced by said hue determining means and for controlling said data reset means on the basis of the interpretation results;

first converting means for converting color image signals into color image signals in a uniform color space, said first converting means being coupled for transmission with said image block type identifying means;

second converting means for converting the image signals from said first converting means into process color signals, said second converting means being coupled for transmission with said hue determining means; and filter means for smoothing images and for emphasizing edges of character images, said filter means being coupled with the output of said data reset means for receiving image data and with said image block type identifying means for receiving a signal for switching parameters of said filter means.

10. A color image processing apparatus for processing color image data including characters and half-tone images, said apparatus comprising:

image block type identifying means for dividing said image data into blocks of pixels and for determining, for each block, whether said each block is of a character type or a half-tone image type;

first under-color-removal means for normal under-color-removal processing;

second under-color-removal means for 100% under-color-removal processing; and selecting means for selecting the output signal of said first under-color-removal means or the output signal of said second under-color-removal means according to an output signal from said image block type identifying means.

11. The color image processing apparatus according to claim 10, further comprising filter means for smoothing images and for emphasizing edges of character images, said filter means being coupled with the output of said data reset means for receiving image data and with said image block type identifying means for receiving a signal for switching parameters of said filter means.

12. The color image processing apparatus according to claim 10, further comprising:

first converting means for converting color image signals into color image signals in a uniform color space, said first converting means being coupled for transmission with said image block type identifying means; and second converting means for converting the image signals from said first converting means into process color signals, said second converting means being coupled for transmission with said determining means.

13. A color image processing apparatus which processes color image data containing characters and half-tone images, said apparatus comprising:

image block type identifying means for dividing said image data into blocks of pixels and for determining, for each block, whether said each block is of a character type or a half-tone image type;

first under-color-removal means for normal under-color-removal processing;

second under-color-removal means for 100% under-color-removal processing;

selecting means for selecting the output signal of said first under-color-removal means or the output signal of said second under-color-removal means according to an output signal from said image block type identifying means;

filter means for smoothing images and for emphasizing edges of character images, said filter means being coupled with the output of said selecting means for receiving image data and with said image block type identifying means for receiving a signal for switching parameters of said filter means;

first converting means for converting color image signals into color image signals in a uniform color space, said first converting means being coupled for transmission with said image block type identifying means; and second converting means for converting the image signals from said first converting means into process color signals, said second converting means being coupled for transmission with said determining means.

14. A color image processing apparatus for processing color image data including characters and half-tone images, said apparatus comprising:

image block type identifying means for dividing said image data into blocks of pixels and for determining, for each block, whether said each block is of a character type or a half-tone image type, by using characteristic values of pixels in said each block;

hue determining means for determining, for each pixel at least within blocks identified as said character type, hue of received color image data to produce a color switch signal, said switch signal indicating which color components are necessary or unnecessary within said blocks identified as said character type;

filter means for smoothing images and for emphasizing edges of character images, said filter means being coupled with the output of said hue determining means for receiving image data and with said image block type identifying means for receiving a signal for switching parameters of said filter means; and data reset means, coupled with said filter means, for resetting unnecessary color component portions of image data corresponding to blocks identified as said character type on the basis of the types identified by said image block type identifying means and the color switch signal produced by said hue determining means.

15. The color image processing apparatus according to claim 14, further comprising interpret/control means for interpreting the result of the types identified by said image block type identifying means and the color switch signal produced by said hue determining means and for controlling said data reset means on the basis of the interpretation results.

16. The color image processing apparatus according to claim 14, in which said data reset means is a tone reduction control circuit.

17. The color image processing apparatus according to claim 14, further comprising:

first converting means for converting color image signals into color image signals in a uniform color space, said first converting means being coupled for transmission with said image block type identifying means; and second converting means for converting the image signals from said first converting means into process color signals, said second converting means being coupled for transmission with said determining means.

18. A color image processing apparatus for processing color image data including characters and half-tone images, said apparatus comprising:

image block type identifying means for dividing said image data into blocks of pixels and for determining, for each block, whether said each block is of a character type or a half-tone image type, by using characteristic values of pixels in said each block;

hue determining means for determining, for each pixel, at least within blocks identified as said character type, hue of received color image data to produce a color switch signal, said switch signal indicating which color components are necessary or unnecessary within said blocks identified as said character type;

selecting means for selecting the type of image according to an output of said image block type identifying means; and data reset means, coupled with the output of said selecting means, for resetting unnecessary color component portions of image data corresponding to blocks identified as said character type on the basis of the types identified by said image block type identifying means and the color switch signal produced by said hue determining means.

19. The color image processing apparatus according to claim 18, further comprising:

first converting means for converting color image signals into color image signals in a uniform color space, said first converting means being coupled for transmission with said image block type identifying means; and second converting means for converting the image signals from said first converting means into process color signals, said second converting means being coupled for transmission with said hue determining means.

20. The color image processing apparatus according to claim 18, further comprising filter means for smoothing images and for emphasizing edges of character images, said filter means being coupled with the output of said data reset means for receiving image data and with said image block type identifying means for receiving a signal for switching parameters of said filter means.

21. A color image processing apparatus for processing color image data including characters and half-tone images, said apparatus comprising:

image block type identifying means for dividing said image data into blocks of pixels and for determining, for each block, whether said each block is of a character type or a half-tone image type, by using characteristic values of pixels in said each block;

hue determining means for determining, for each pixel, at least within blocks identified as said character type, hue of received color image data to produce a color switch signal, said switch signal indicating which color components are necessary or unnecessary within said blocks identified as said character type;

selecting means for selecting the type of image area according to an output signal of said image block type identifying means;

data reset means, coupled with the output of said selecting means, for resetting unnecessary color component portions of image data corresponding to blocks identified as said character type on the basis of the types identified by said image block type identifying means and the color switch signal produced by said hue determining means;

first converting means for converting color image signals into color image signals in a uniform color space, said first converting means being coupled for transmission with said image block type identifying means;

second converting means for converting the image signals from said first converting means into process color signals, said second converting means being coupled for transmission with said hue determining means; and filter means for smoothing images and for emphasizing edges of character images, said filter means being coupled with the output of said data reset means for receiving image data and with said image block type identifying means for receiving a signal for switching parameters of said filter means.

22. A hue discriminator comprising:

maximum detecting means for detecting maximum values of three color signals Y, M, and C;

minimum detecting means for detecting minimum values of three color signals Y, M, and C;

subtracting means for calculating the difference between the maximum and minimum values, and the difference between each of the color signals and the minimum value;

comparing means for comparing the output signals of said subtracting means with threshold values, and the output signal of said minimum detecting means; and final decision means for deciding hue on the basis of the output signals of said comparing means.

23. A hue discriminator comprising:

a maximum detector for detecting a maximum value of each of color data signals Y, M and C;

a minimum detector for detecting a minimum value of each of color data signals Y, M and C;

first to fourth subtractors for calculating respectively the difference between the maximum and minimum values output said maximum and minimum detectors, the difference between the minimum value and the color signal Y, the difference between the minimum value and the color signal M, and the difference between the minimum value and the color signal C;

first to fourth comparators for comparing respectively the output signal of said first subtractor with a first threshold value, the output signal of said minimum detector with a second threshold value, the output signal of said second subtractor with a third threshold value, the output signal of said third subtractor with a fourth threshold value, and the output signal of said fourth subtractor with a fifth threshold value; and a memory for storing a hue discriminating table, said memory being addressed by the combination of the output signals of said first to fifth comparators.

* * * * *